(12) United States Patent
Yamauchi et al.

(10) Patent No.: US 6,887,175 B2
(45) Date of Patent: May 3, 2005

(54) HYBRID TRANSMISSION

(75) Inventors: Yasuhiro Yamauchi, Kanagawa (JP); Yuusuke Minagawa, Kanagawa (JP); Toshikazu Oshidari, Kanagawa (JP); Keyvan Kargar, Versailles (FR); Yves Pichon, Boulogne-Billancourt (FR)

(73) Assignees: Nissan Motor Co., Ltd., Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 0 days.

(21) Appl. No.: 10/445,907

(22) Filed: May 28, 2003

(65) Prior Publication Data

US 2003/0232678 A1 Dec. 18, 2003

(30) Foreign Application Priority Data

Jun. 17, 2002 (JP) ........................................ 2002-175980

(51) Int. Cl.⁷ ................................................ F16H 3/72
(52) U.S. Cl. ............................................ 475/10; 475/5
(58) Field of Search ...................................... 475/10, 5

(56) References Cited

U.S. PATENT DOCUMENTS 5,558,589 A    9/1996  Schmidt
6,371,878 B1 *  4/2002  Bowen ........................... 475/5
6,579,201 B2 *  6/2003  Bowen ........................... 475/5
6,732,526 B2 *  5/2004  Minagawa et al. ........... 60/706

FOREIGN PATENT DOCUMENTS

JP    2000-142146 A    5/2000

* cited by examiner

*Primary Examiner*—Dirk Wright
(74) *Attorney, Agent, or Firm*—Foley & Lardner LLP

(57) ABSTRACT

A hybrid transmission for a hybrid vehicle is comprised of a two-degree-of-freedom differential mechanism and a brake. The differential mechanism includes at least five rotating members wherein four of the rotating members are connected to an input from a main power source, an output to a driveline, first and second mover/generators, respectively. The brake is connected to one of the rotating members and is capable of being put in an engaged state to brake the one of the rotating members. The hybrid transmission is set so that an absolute value of a revolution speed of the rotating member connected to the output is greater than an absolute value of a revolution speed of the rotating member connected to the input when the brake is put in the engaged state.

16 Claims, 11 Drawing Sheets

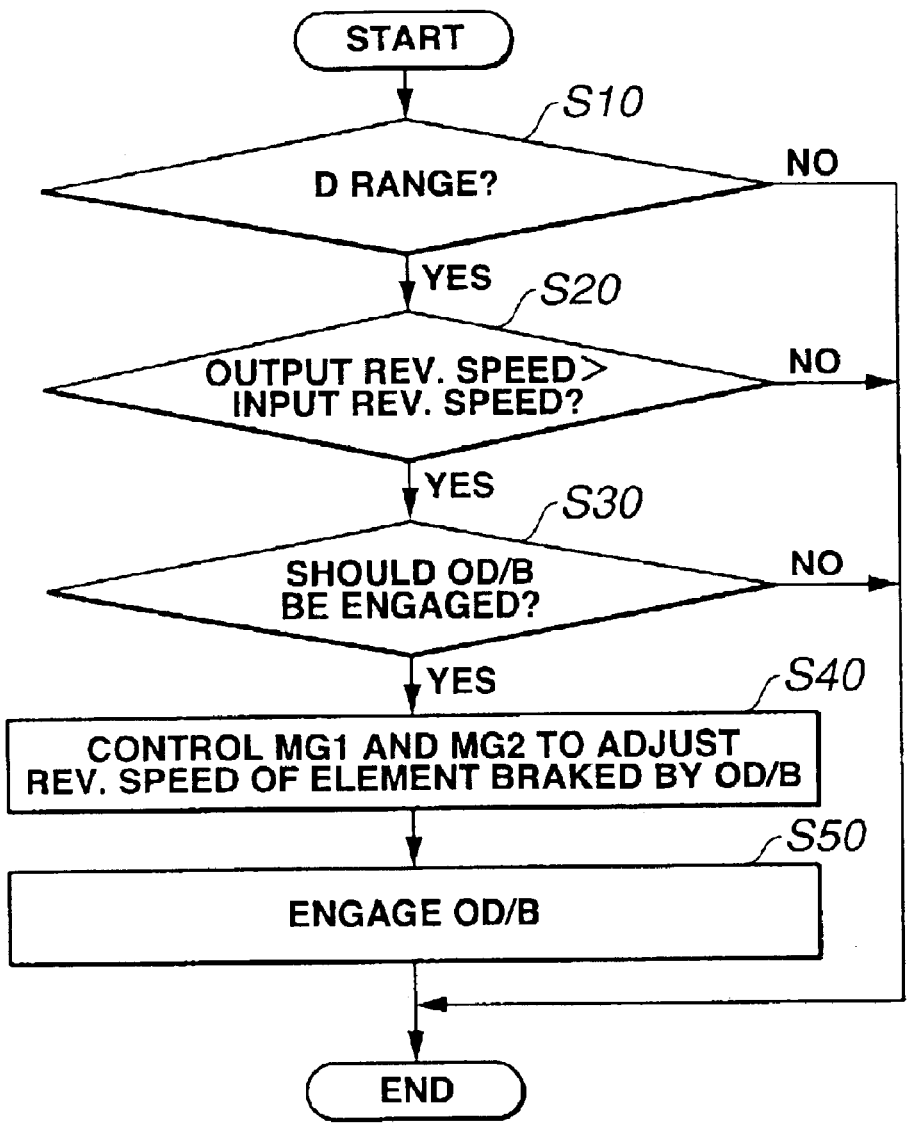

HYBRID TRANSMISSION

BACKGROUND OF THE INVENTION

The present invention relates to a hybrid transmission which is applicable to a hybrid vehicle equipped with a plurality of power sources such as an internal combustion engine and a motor/generator, and more particularly to a continuously variable hybrid transmission which is capable of continuously varying a transmission ratio using a differential mechanism.

JP-A-2000-142146 discloses a hybrid transmission for a hybrid vehicle. This hybrid transmission employs a two-degree-of-freedom differential device including three rotating elements which are connected to an input from an engine, an output to a driveline and a motor/generator, respectively.

SUMMARY OF THE INVENTION

However, this hybrid transmission has a limitation in selecting a high-side transmission ratio such as an overdrive transmission ratio due to a structural limitation of this hybrid transmission. That is, if this hybrid transmission is arranged to be selectable of the overdrive, the use of the overdrive requires increasing the load of the motor/generator and thereby requiring a larger motor/generator or disaffecting fuel consumption.

It is therefore an object of the present invention to provide a hybrid transmission which is capable of achieving an overdrive transmission ratio without increasing the capacity of motor/generators, and of improving fuel consumption, by the proper selection of the high-speed side transmission ratio using the fixing of one of the rotating members of the hybrid transmission.

An aspect of the present invention resides in a hybrid transmission which is for a hybrid vehicle and comprises a differential mechanism including at least five rotating members, the rotating members being interlinked so that rotating conditions of all of the rotating members are determined when rotating conditions of two of the rotating members are determined, four of the rotating members being connected to an input from a main power source, an output to a driveline, first and second mover/generators, respectively; and a brake connected to one of the rotating members, the brake being capable of being put in an engaged state to brake the one of the rotating members; wherein an absolute value of a revolution speed of the rotating member connected to the output is greater than an absolute value of a revolution speed of the rotating member connected to the input when the brake is put in the engaged state.

Another aspect of the present invention resides in a hybrid transmission for a hybrid vehicle. The hybrid transmission comprising a two-degree-of-freedom differential mechanism including at least five rotating members, the rotating members being interlinked so that rotating conditions of all of the rotating members are determined when rotating conditions of two of the rotating members are determined, five of the rotating members being connected to a first motor/generator, one of a brake and an output to a driveline, an input from a main power source, the other of the brake and the output to the driveline, and a second motor/generator, respectively, in the sequence of revolution speeds of the five rotating members.

A further another aspect of the present invention resides in a hybrid transmission for a hybrid vehicle, comprising: a two-degree-of-freedom differential mechanism including at least six rotating members, the rotating members being interlinked so that rotating conditions of all of the rotating members are determined when rotating conditions of two of the rotating members are determined, six of the rotating members being connected to a second motor/generator, a first brake, an input from a main power source, an output to the driveline, a second brake and a first motor/generator, respectively, in the sequence of revolution speeds of the five rotating members.

The other objects and features of this invention will become understood from the following description with reference to the accompanying drawings.

BRIEF DESCRIPTION OF THE DRAWINGS

FIG. 10 is a flowchart showing an engagement control program of an overdrive brake of the hybrid transmission throughout FIGS. 1A through 9B.

DETAILED DESCRIPTION OF THE INVENTION

Referring to FIGS. 1A through 11, there are shown embodiments of a hybrid transmission according to the present invention.

Figures 1A, 1B:
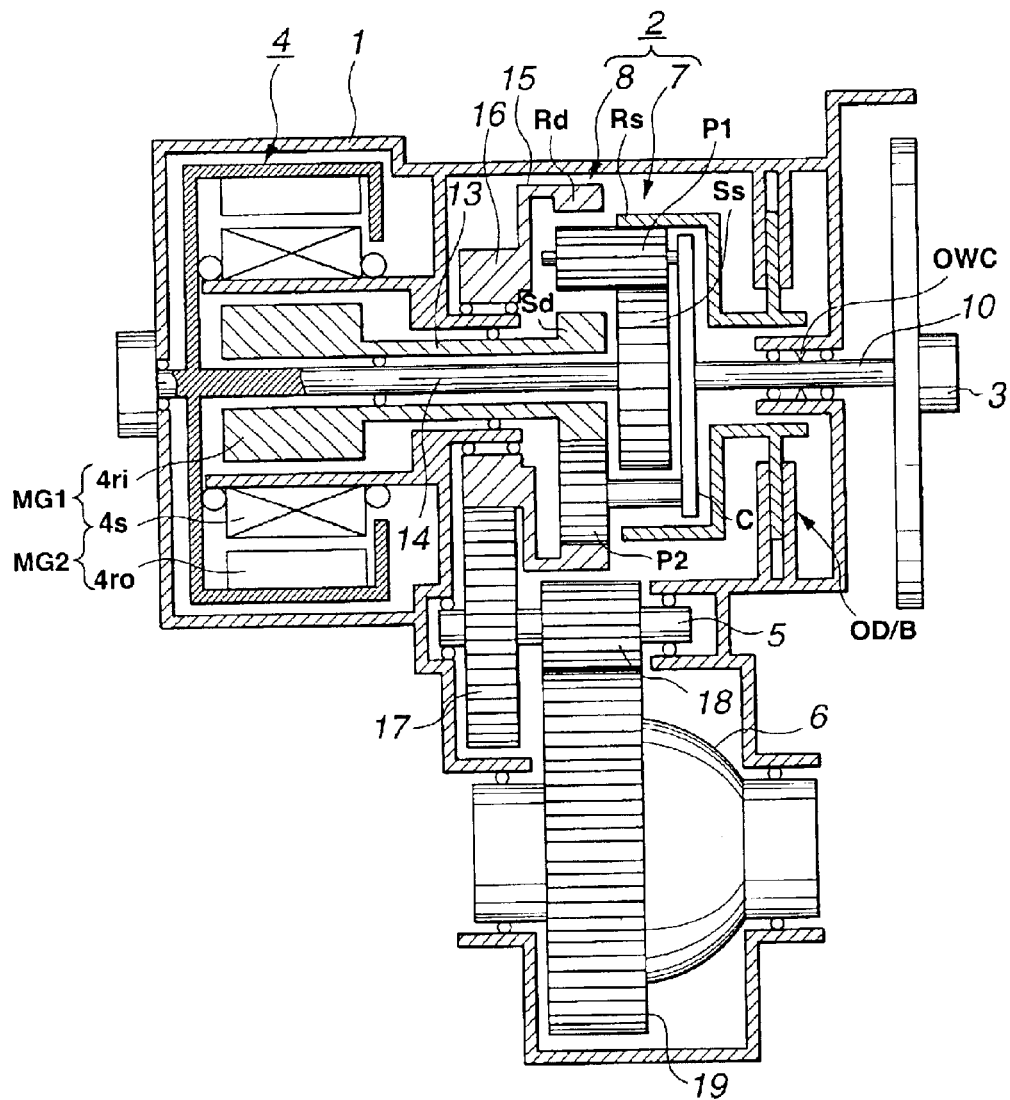
FIG. 1A is a cross-sectional view showing a first embodiment of a hybrid transmission according to the present invention.
FIG. 1B is a lever diagram of the hybrid transmission of FIG. 1A.

FIGS. 1A and 1B show a first embodiment of the hybrid (automatic) transmission according to the present invention. In this first embodiment, the hybrid transmission is adapted to a transaxle of a front-wheel-drive vehicle. As shown in FIG. 1A, the hybrid transmission of the first embodiment comprises a transmission case 1, a Ravigneaux planetary gearset 2, and a compound-current double-layer motor 4 constructing first and second motor/generators MG1 and MG2. Ravigneaux planetary gearset 2 is built in transmission case 1 so as to be located at a left-hand side of an internal combustion engine (prime mover) 3 along an axial direction of transmission case 1 in FIG. 1A. Further, compound-current double-layer motor 4 is built in a transmission case 1 so as to be located at the left-hand side of Ravigneaux planetary gearset 2 along the axial direction of transmission case 1 in FIG. 1A.

Ravigneaux planetary gearset 2, engine 3 and compound-current double-layer motor 4 are coaxially arranged on a main axis of transmission case 1. A counter shaft 5 and a differential gear device 6 are also built in transmission case 1 so as to be parallel with the main axis while being offset from the main axis.

Ravigneaux planetary gearset 2 is of a compound planetary gear train where a single-pinion planetary gearset 7 is combined with a double-pinion planetary gearset 8, and common pinions P1 and a common ring gear Rs are commonly employed in two planetary gearsets 7 and 8. Single-pinion planetary gearset 7 is located near engine 3 than double-pinion planetary gearset 8, and double-pinion planetary gearset 8 is located near compound-current double-layer motor 4.

Single-pinion planetary gearset 7 comprises a sun gear Ss, common ring gear Rs and common pinions P1 in meshed-engagement with both sun gear Ss and common ring gear Rs. Double-pinion planetary gearset 8 comprises a sun gear Sd, common pinions P1, common ring gear Rs, a ring gear Rd, and large-diameter pinions P2. Large-diameter pinions P2 are in mesh-engagement with sun gear Sd, ring gear Rd and common pinions P1. Pinions P1 and P2 of the two planetary gearsets 7 and 8 are rotatably mounted or supported on shafts that integrally project from a common pinion carrier C.

Ravigneaux planetary gearset 2 is mainly constituted by five rotating members (five rotating elements), that is, sun gear Ss, sun gear Sd, ring gear Rs, ring gear Rd and pinion carrier C. When rotating conditions of two of the rotating members in Ravigneaux planetary gearset 2 are determined, rotating conditions of all of the rotating members are determined. That is to say, Ravigneaux planetary gearset 2 is a two-degree-of-freedom differential mechanism having five rotating elements.

As is clear from a lever diagram shown in FIG. 1B, the sequence of revolution speeds of the rotating members is arranged in the sequence of sun gear Sd, ring gear Rs, carrier C, ring gear Rd and sun gear Ss from a high revolution speed side.

Ravigneaux planetary gearset 2 employed in this first embodiment is equivalent to a gearset which is arranged such that a ring gear of single-pinion planetary gearset 7 is connected to a ring gear of double-pinion planetary gearset 8, and a carrier of single-pinion planetary gearset 7 is connected to a carrier of double-pinion planetary gearset 8.

Such a gearset having five elements and performing the two-degree-of-freedom may be constructed by combining three of single-pinion planetary gearsets constructed by nine rotating elements and by connecting these three single-pinion planetary gearsets at four portions without connecting a rotating member and another rotating member.

Compound-current double-layer motor 4 comprises an inner rotor 4ri, an annular outer rotor 4ro surrounding inner rotor 4ri and a stator coil 4s. Inner and outer rotors 4ri and 4ro are coaxially arranged with each other at the rear axial end (the left-hand end) of transmission case 1 and rotatably supported in transmission case 1. Annular stator coil 4s acting as a stator of compound-current double-layer motor 4 is disposed in an annular space defined between the outer periphery of inner rotor 4ri and the inner periphery of outer rotor 4ro and fixedly connected to transmission case 1. Annular stator coil 4s and inner rotor 4ri construct an inner motor/generator (first motor/generator) MG1, and annular stator coil 4s and outer rotor 4ro construct an outer motor/generator (second motor/generator) MG2.

In this embodiment, a compound multiphase alternating current (AC) multi-layer (double-layer) motor 4, which has multiple motors (two rotors in this embodiment) and is driven by compound multiphase AC, is employed as first and second motor/generator MG1 and MG2. Further, compound-current double-layer motor 4 is arranged such that the number of pole pairs of inner rotor 4ri is different from the number of pole pairs of outer rotor 4ro. Inner and outer rotors 4ri and 4ro of first and second motor/generators MG1 and MG2 are therefore driven independently of each other in revolution speed and in revolution direction by compounding a control current applied to one of the motor/generator set and a control current applied to the other.

When compound multiphase alternating current is supplied to each of first and second motor/generators MG1 and MG2, each of motor/generators MG1 and MG2 functions as an electric motor which outputs a rotational force having a revolution direction corresponding to a current direction and a revolution speed corresponding to a current strength of the supplied current. When no compound multiphase alternating current is supplied to each of first and second motor/generators MG1 and MG2, each of first and second motor/generators MG1 and MG2 functions as a generator which outputs an electric power corresponding to the magnitude of torque applied by way of an external force.

As is shown in FIG. 1B, sun gear Sd, ring gear Rs, carrier C, ring gear Rd, and sun gear Ss, which are five rotating members of Ravigneaux planetary gearset 2, are connected to first motor/generator MG1 (inner rotor 4ri), an overdrive brake OD/B for selecting an overdrive position, an input IN connected to engine 3, an output OUT connected to a wheel driveline and second motor/generator MG2 (outer rotor 4ro), respectively. This mentioned sequence of the five rotating members are arranged in the sequence of the revolution speeds from the highest revolution speed.

The connection of the five rotating members of Ravigneaux planetary gearset 2 will be discussed in detail with reference to FIG. 1A.

Carrier C acts as an input element through which the power of engine 3 is inputted to the hybrid transmission. That is, carrier C is connected to a crankshaft of engine 3 through an input shaft 10 of the hybrid transmission. A one-way clutch OWC for preventing a reverse revolution against the revolution of engine 3 is provided between transmission input shaft 10 and transmission case 1. Sun gear Sd is connected to first motor/generator MG1 (inner rotor 4ri) through a hollow shaft 13. Sun gear Ss is connected to second motor/generator MG2 (outer rotor 4ro) through a shaft 14 which is rotatably supported by first motor/generator MG1 and hollow shaft 13. Overdrive brake OD/B is connected to ring gear Rs so that ring gear Rs is braked at a desired period through the engagement operation of overdrive brake OD/B.

In order to operate ring gear Rd as an output element for outputting the revolution to the wheel drive line, ring gear Rd is connected to an output gear 16 through a connecting member 15 of a stepped hollow structure, and output gear 16 is mesh-engaged with a counter gear 17 integrally connected to a counter shaft 5 which is rotatably supported by transmission case 1. Counter gear 17 is disposed between Ravigneaux planetary gearset 2 and compound-current double-layer motor 4. A final-drive pinion 18 is also integrally connected to counter shaft 5 and is mesh-engaged with a final-drive ring gear 19 provided in a differential gear device 6.

The transmission output revolution outputted from output gear 16 is transmitted to final differential gear device 6 through a final drive gearset constructed by final drive pinion 18 and final drive ring gear 19, and is distributed to the right and left wheels (not shown) through final differential device 6. This transmitting line constitutes a wheel driveline.

The hybrid transmission of the first embodiment achieves the shift operation represented by the lever diagram in FIG. 1B as follows.

Referring to a shift operation under a forward (right) revolution outputting state of the hybrid transmission, when the vehicle starts to run, at least one of first and second motor/generators MG1 and MG2 is driven in the forward revolution direction to generate the forward revolution at output OUT. Thereafter, engine 3 is properly started so as to enable the drive wheels to be driven by the engine output.

If the forward revolution is increased only by increasing the revolution speeds of first and second motor/generators MG1 and MG2 and engine 3, the increase of the forward revolution speed at output OUT is limited by the revolution speed limit of first and second motor/generators MG1 and MG2 and engine 3.

In contrast, as shown by the lever diagram of FIG. 1B, by fixing ring gear Rs through the engagement of overdrive brake OD/B and by changing the revolution direction of first motor/generator MG1 from the forward (right) revolution state to the backward (reverse) revolution state, the forward revolution at output OUT is further raised up. Consequently, this arrangement enables the hybrid transmission to produce a highly-set overdrive ratio wherein the revolution speed at output OUT is higher than that at input IN.

Further the hybrid transmission realizes the overdrive transmission ratio by fixing ring gear Rs which is located opposite to output OUT through input IN in the lever diagram of FIG. 1B. That is, the overdrive transmission ratio is achieved without excessively increasing a load to first and second motor/generators MG1 and MG2 in view of a lever ratio of the lever diagram of FIG. 1B.

This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

Further, generative maximum driving force varies according to whether overdrive brake OD/B is in an engaged state or in a disengaged state. More specifically, the generative maximum driving force under the engaged state of overdrive brake OD/B is greater than that under the disengaged state of overdrive brake OD/B.

Therefore, a shock is generated when the state of overdrive brake OD/B is changed between the engaged state and the disengaged state, if such a change between the engagement state and the disengagement state of overdrive brake OD/B is simply executed. In order to eliminate this shock due to the change between the engaged state and the disengaged state, an operation is executed as shown in flowcharts of FIGS. 10 and 11.

The flowchart of FIG. 10 discloses a control executed for changing the state of overdrive brake OD/B from the engaged state to the disengaged state. When it is determined that the hybrid transmission is set in D range (the affirmative determination at step S10), when it is determined that a required revolution speed at output OUT is greater than the revolution speed at input IN (the affirmative determination at step S20), and when it is determined that overdrive brake OD/B should be engaged (the affirmative determination at step S30), that is, when a request for producing the overdrive transmission ratio is generated, the following engagement operations are executed.

First, one or both of first and second motor/generators MG1 and MG2 is controlled in driving force so as to bring the revolution speed of the brake element (ring gear Rs in the first embodiment) braked by overdrive brake OD/B closer to zero. This operation corresponds to the processing at step S40 of FIG. 10. Then, the engagement operation of overdrive brake OD/B is executed. This operation corresponds to the processing at step S50. That is, when the affirmative determination is made at all of steps S10, S20 and S30, the program proceeds to step S40.

By this execution of steps S40 and S50, the engagement of overdrive brake OD/B is executed without generating the relative revolution of the brake, and thereby eliminating the shock due to the engagement of overdrive brake OD/B.

Figure 11:
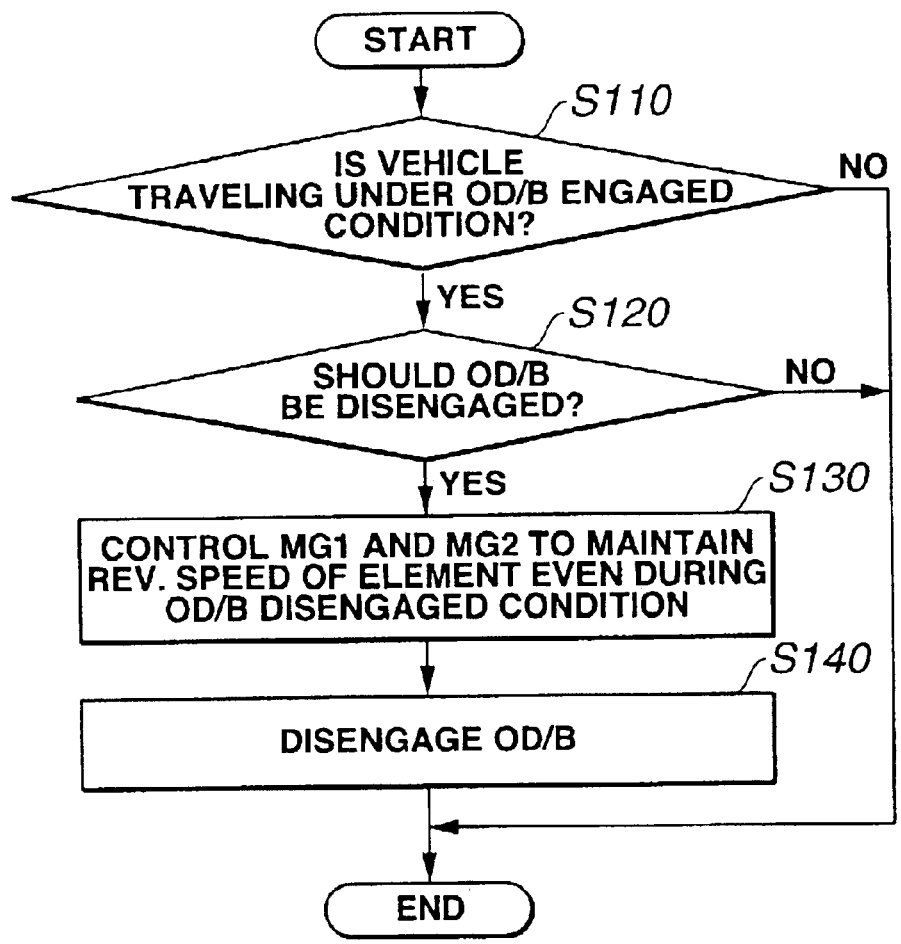
FIG. 11 is a flowchart showing a disengagement control program of the overdrive brake of the hybrid transmission throughout FIGS. 1A through 9B.

The flowchart of FIG. 11 represents a control for changing the state of overdrive brake OD/B from the engaged state to the disengaged state.

When it is determined that the vehicle is traveling under the engaged state of overdrive brake OD/B (the affirmative determination at step S110) and when it is determined that overdrive brake OD/B should be disengaged (the affirmative determination at step S120), that is, when a request for changing a transmission ratio except for the overdrive transmission ratio is generated, the disengagement of overdrive brake OD/B is executed as follows.

First, one or both of first and second motor/generators MG1 and MG2 is controlled in driving force so as to maintain the revolution speed of the brake element (ring gear Rs in the first embodiment) braked by overdrive brake OD/B at zero even if overdrive brake OD/B is disengaged. This operation corresponds to the processing at step S130. Then, the disengagement operation of overdrive brake OD/B is executed. This operation corresponds to the processing at step S140.

By this execution of steps S130 and S140, the disengagement of overdrive brake OD/B is executed without generating the relative revolution of the brake, and thereby eliminating the shock due to the disengagement of overdrive brake OD/B.

Further, by setting first and second motor/generators MG1 and MG2 in an inoperative state under the engaged state of overdrive brake OD/B, it becomes possible to operate first and second motor/generators MG1 and MG2 while adjusting the electric balance therebetween.

Furthermore, when overdrive brake OD/B is put in the disengaged state, by operating first motor/generator MG1 as a generator (in the reverse revolution state) and by operating second motor/generator MG2 as a motor (in the right revolution), it is possible to operate first and second motor/generators MG1 and MG2 while adjusting the electric balance therebetween.

Furthermore, by increasing the output of second motor/generating MG2 functioning as a motor with respect to that of first motor/generator MG1 functioning as a generator or by operating both of first and second motor/generators as motors, it becomes possible to output the power greater than the power generated by engine 3.

When overdrive brake OD/B is put in the disengaged state, the hybrid transmission can take two operating points (specific input output revolution ratio) where one of first and second motor/generators MG1 and MG2 is stopped (put in zero revolution speed). At these input-output revolution ratios (transmission ratios), the hybrid transmission can operate without consuming electric power.

At a transmission ratio between the specific input-output revolution ratios, it is possible to decrease a ratio of an electric transmission quantity in the transmitted power of the hybrid transmission wherein the efficiency of electric power transmission is lower than that of the mechanical transmission. This improves the power transmission efficiency of the hybrid transmission.

In addition, as shown by the lever EV of the lever diagram in FIG. 1B, it is possible to obtain output power only by the operation of first and second motor/generators MG1 and MG2 without depending on engine 3. That is, the hybrid transmission according to the present invention enables the vehicle to operate as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rs is fixed by the engagement of overdrive brake OD/B and carrier C is fixed in the reverse direction by one-way clutch OWC. This arrangement prevents the vehicle stopped on an upslope from naturally moving back, and facilitates an upslope starting which can be achieved only by depressing an accelerator pedal.

When the hybrid transmission is in a shift condition represented by the lever MAX of the lever diagram in FIG. 1B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rd is raised up at the maximum revolution speed.

Further, when the hybrid transmission is in a shift condition represented by the lever REV of the lever diagram in FIG. 1B, a reverse revolution is outputted from ring gear Rd to output OUT. That is, the hybrid transmission is in a backward revolution (reverse revolution) output condition. Under this condition, it is possible to drive first motor/generator MG1 in the right revolution output direction and to drive second motor/generator MG1 in the reverse revolution output direction while one-way clutch OWC performs the reverse revolution preventing function.

Figure 2:
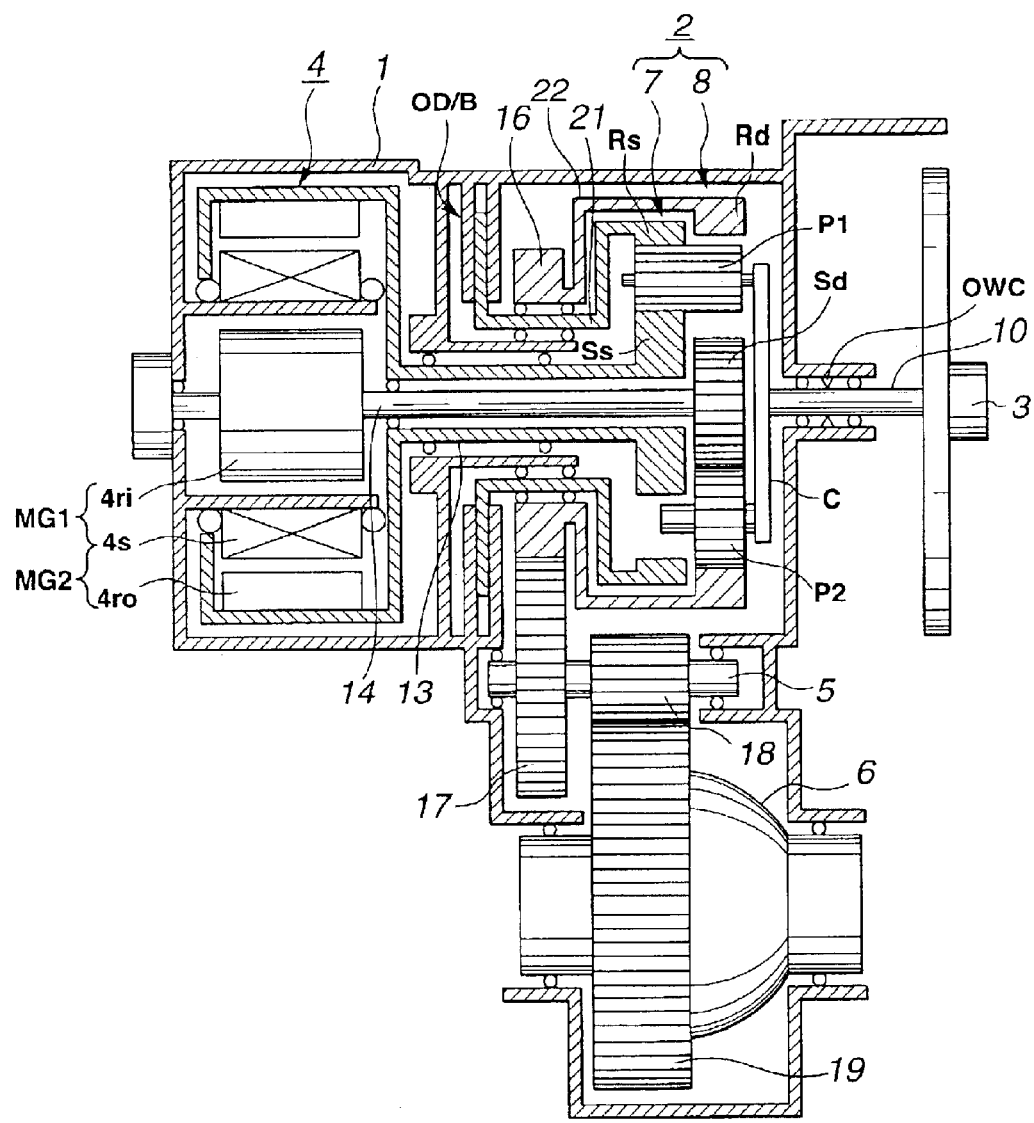
FIG. 2 is a cross-sectional view showing a second embodiment of the hybrid transmission according to the present invention.

FIG. 2 shows a second embodiment of the hybrid transmission according to the present invention. The hybrid transmission is also adapted to a transaxle for a front-engine front-drive vehicle (FF vehicle).

In this embodiment, single-pinion planetary gearset 7 of Ravigneaux planetary gearset 2 is located near compound-current double-layer motor 4 and apart from engine 3, and double-pinion planetary gearset 8 of Ravigneaux planetary gearset 2 is located near engine 3.

As is similar to the lever diagram of FIG. 1B, the revolution speeds of five rotating members of sun gear Ss, sun gear Sd, ring gear Rs, ring gear Rd and carrier C of Ravigneaux planetary gearset 2 are set to be arranged in the order of mention.

With respect to these five rotating members, first motor/generator MG1 (inner rotor 4ri), overdrive brake OD/B for selecting the overdrive position, input IN connected to engine 3, output OUT connected to the wheel driveline and second motor/generator MG2 (outer rotor 4ro) are connected respectively, as is similar to FIG. 1B.

The connection of the five rotating members of Ravigneaux planetary gearset 2 employed in the second embodiment will be discussed in detail on the basis of FIG. 2.

A carrier C is connected to the crankshaft of engine 3 through a transmission input shaft 10, and a one-way clutch OWC for preventing a reverse revolution against the revolution of engine 3 is provided between transmission input shaft 10 and transmission case 1. Sun gear Ss is connected to second motor/generator MG2 (outer rotor 4ro) through a hollow shaft 13. Sun gear Sd is connected to first motor/generator MG1 (inner rotor 4ri) through a shaft 14 which is rotatably supported by hollow shaft 13. A hollow shaft portion 21 extends from ring gear Rs toward compound-current double-layer motor 4. Overdrive brake OD/B is connected through hollow shaft portion 21 to ring gear Rs so that ring gear Rs is braked at a desired period through the engagement operation of overdrive brake OD/B. Hollow shaft portion 21 is rotatably supported by transmission case 1 and rotatably supports an output gear 16 disposed between compound-current double-layer motor 4 and Ravigneaux planetary gearset 2. Output gear 16 is connected to ring gear Rd through a connecting member 22 so that the transmission output revolution is outputted from final differential device 5 through output gear 16, a counter gear 17, a final drive pinion 18 and a final drive ring gear 19.

The hybrid transmission arranged as discussed above, is represented by the lever diagram shown in FIG. 1B, and executes the shift operation as same as that in the first embodiment, and ensures the advantages as same as that gained in the first embodiment.

In this second embodiment shown in FIG. 2, overdrive brake OD/B is located between Ravigneaux planetary gearset 2 and compound-current double-layer motor 4. In contrast, in the first embodiment shown in FIG. 1A, overdirve brake OD/B is located between Ravigneaux planetary gearset 2 and engine 3. It will be understood that the selecting one arrangement from the first and second embodiments may be freely determined according to the easiness of ensuring a space for providing overdirve brake OD/B.

Figure 3A:
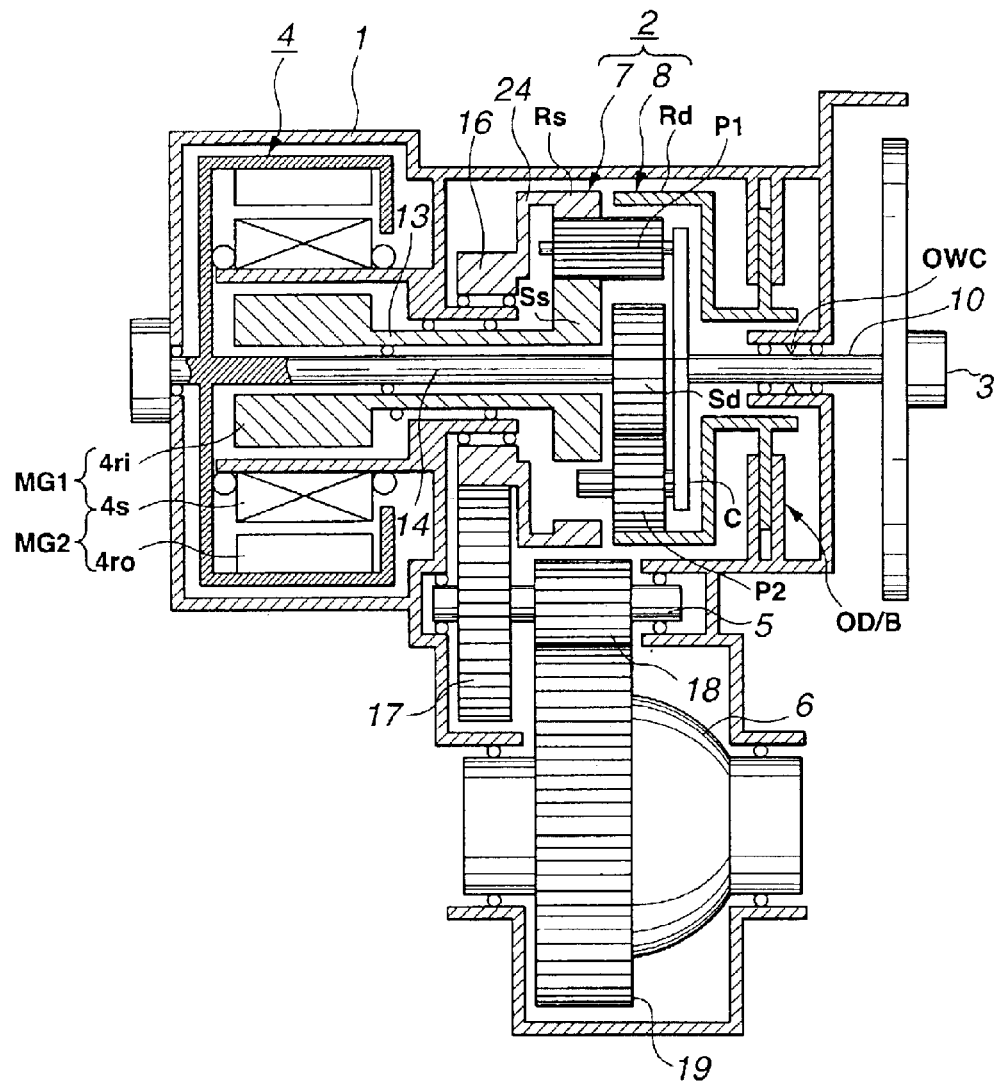
FIG. 3A is a cross-sectional view showing a third embodiment of the hybrid transmission according to the present invention.

FIG. 3A shows a third embodiment of the hybrid transmission according to the present invention. The hybrid transmission is also adapted to a transaxle for a front-engine front-drive vehicle (FF vehicle) as is similar to those shown in FIGS. 1a and 2.

In this embodiment, single-pinion planetary gearset 7 of Ravigneaux planetary gearset 2 is located near compound-current double-layer motor 4 and apart from engine 3, and double-pinion planetary gearset 8 of Ravigneaux planetary gearset 2 is located near engine 3, as is similar to the arrangement of FIG. 2.

Figure 3B:
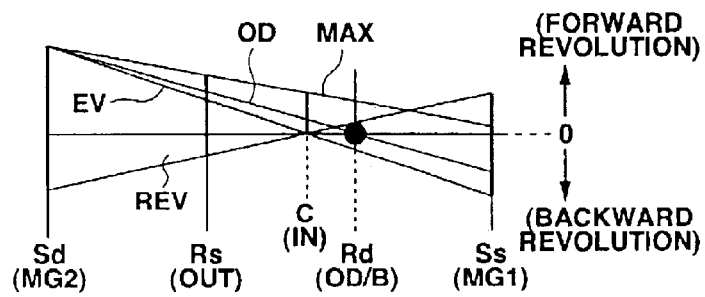
FIG. 3B is a lever diagram of the hybrid transmission of FIG. 3A.

As shown in FIG. 3B, the revolution speeds of five rotating members of sun gear Ss, sun gear Sd, ring gear Rs, ring gear Rd and carrier C of Ravigneaux planetary gearset 2 are set to be arranged in the order of mention. The arrangement in view of the revolution speed is the same as that shown by the lever diagram in FIG. 1B. That is, they are arranged in the sequence of sun gear Sd, ring gear Rs, carrier C, ring gear Rd and sun gear Ss.

With respect to these five rotating members, first motor/generator MG2 (outer rotor 4ro), output OUT connected to the wheel driveline, input IN connected to engine 3, overdrive brake OD/B for selecting the overdrive position, and first motor/generator MG1 (inner rotor 4ri) are connected respectively, as shown in FIG. 3B.

The connection of the five rotating members of Ravigneaux planetary gearset 2 employed in the third embodiment will be discussed in detail on the basis of FIG. 3A.

Carrier C is connected to the crankshaft of engine 3 through transmission input shaft 10, and one-way clutch OWC for preventing a reverse revolution against the revolution of engine 3 is provided between transmission input shaft 10 and transmission case 1. Sun gear Ss is connected to first motor/generator MG1 (inner rotor 4ri) through a hollow shaft 13. Sun gear Sd is connected to second motor/generator MG2 (inner rotor 4ro) through a shaft 14 which is rotatably supported by hollow shaft 13. A connecting member 24 extends from ring gear Rs toward compound-current double-layer motor 4. Ring gear Rs is connected through connecting member 24 to output gear 16 which is located between Ravigneaux planetary gearset 2 and compound-current double-layer motor 4, and which is rotatably supported by transmission case 1. Overdrive brake OD/B is disposed between Ravigneaux planetary gearset 2 and engine 3 and is connected to ring gear Rd so that ring gear Rs is braked at a desired period through the engagement operation of overdrive brake OD/B.

The hybrid transmission of the third embodiment achieves the shift operation represented by the lever diagram in FIG. 3B as follows.

Referring to a shift operation under a forward (right) revolution outputting state of the hybrid transmission, when the vehicle starts to run, at least one of first and second motor/generators MG1 and MG2 is driven in the forward revolution direction to generate the forward revolution at output OUT. Thereafter, engine 3 is properly started so as to enable the drive wheels to be driven by engine output.

If the forward revolution is increased only by increasing the revolution speeds of first and second motor/generators MG1 and MG2 and engine 3, the increase of the speed of the forward revolution at output OUT is limited by the revolution limit of first and second motor/generators MG1 and MG2 and engine 3.

In contrast, as shown by the lever diagram of FIG. 3B, by fixing ring gear Rd through the engagement of overdrive brake OD/B and by changing the revolution direction of first motor/generator MG1 from the forward (right) revolution state to the backward (reverse) revolution state, the forward revolution at output OUT is further raised up. Consequently, this arrangement enables the hybrid transmission to produce a highly-set overdrive ratio wherein the revolution speed at output OUT is higher than that at input IN.

Further the hybrid transmission realizes the overdrive transmission ratio by fixing ring gear Rd which is located opposite to output OUT through input IN in the lever diagram of FIG. 3B. That is, the overdrive transmission ratio is achieved without excessively increasing a load to first and second motor/generators MG1 and MG2 in view of a lever ratio of the lever diagram of FIG. 3B.

This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

Further, generative maximum driving force varies according to whether overdrive brake OD/B is in an engaged state or in a disengaged state. More specifically, the generative maximum driving force under the engaged state of overdrive brake OD/B is greater than that under the disengaged state of overdrive brake OD/B.

Therefore, a shock is generated when the state of overdrive brake OD/B is changed between the engaged state and the disengaged state, if such a change is simply executed. However, such engagement and disenagement of overdrive brake OD/B shock can be avoided by executing the operations as shown in flowcharts of FIGS. 10 and 11. The explanation of the operations in FIGS. 10 and 11 is the same as that in the first embodiment, and therefore it is omitted herein.

Further, by setting first and second motor/generators MG1 and MG2 in an inoperative state under the engaged state of overdrive brake OD/B, it becomes possible to operate first and second motor/generators MG1 and MG2 under a condition of adjusting the electric balance therebetween.

Furthermore, when overdrive brake OD/B is in the disengaged state, by operating first motor/generator MG1 as a generator (in the reverse revolution state) and by operating second motor/generator MG2 as a motor (in the right revolution), it is possible to operate first and second motor/generators MG1 and MG2 while adjusting the electric balance therebetween.

Furthermore, by increasing the output of second motor/generating MG2 functioning as a motor with respect to that of first motor/generator MG1 functioning as a generator or by operating both of first and second motor/generators as motors, it becomes possible to output the power greater than the power generated by engine 3.

When overdrive brake OD/B is in the disengaged state, the hybrid transmission can take two operating points (specific input output revolution ratio) where one of first and second motor/generators MG1 and MG2 is stopped (put in zero revolution speed). At these input-output revolution ratios, the hybrid transmission can operate without consuming electric power.

At a transmission ratio between the specific input-output revolution ratios, it is possible to decrease a ratio of an electric transmission quantity in the transmitted power of the hybrid transmission where the efficiency of electric power transmission is lower than that of the mechanical transmission. This improves the power transmission efficiency of the hybrid transmission.

In addition, as shown by the lever EV of the lever diagram in FIG. 3B, it is possible to ensure (obtain) output power only by the operation of first and second motor/generators MG1 and MG2 without depending on engine 3. That is, the hybrid transmission according to the present invention enables the vehicle to operate as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rd is fixed by the engagement of overdrive brake OD/B and carrier C is fixed in the reverse direction by one-way clutch OWC. This arrangement prevents the vehicle stopped on an upslope from naturally moving back, and facilitates an upslope starting which can be achieved only by depressing an accelerator pedal.

When the hybrid transmission is in a shift condition represented by the lever MAX of the lever diagram in FIG. 3B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rs is raised up at the maximum revolution speed.

Further, when the hybrid transmission is in a shift condition represented by the lever REV of the lever diagram in FIG. 1B, a reverse revolution is outputted from ring gear Rs to output OUT. That is, the hybrid transmission is in a backward revolution (reverse revolution) output condition. Under this condition, it is possible to drive first motor/generator MG1 in the right revolution output direction and to drive second motor/generator MG1 in the reverse revolution output direction while one-way clutch OWC performs the reverse revolution preventing function.

Figure 4A:
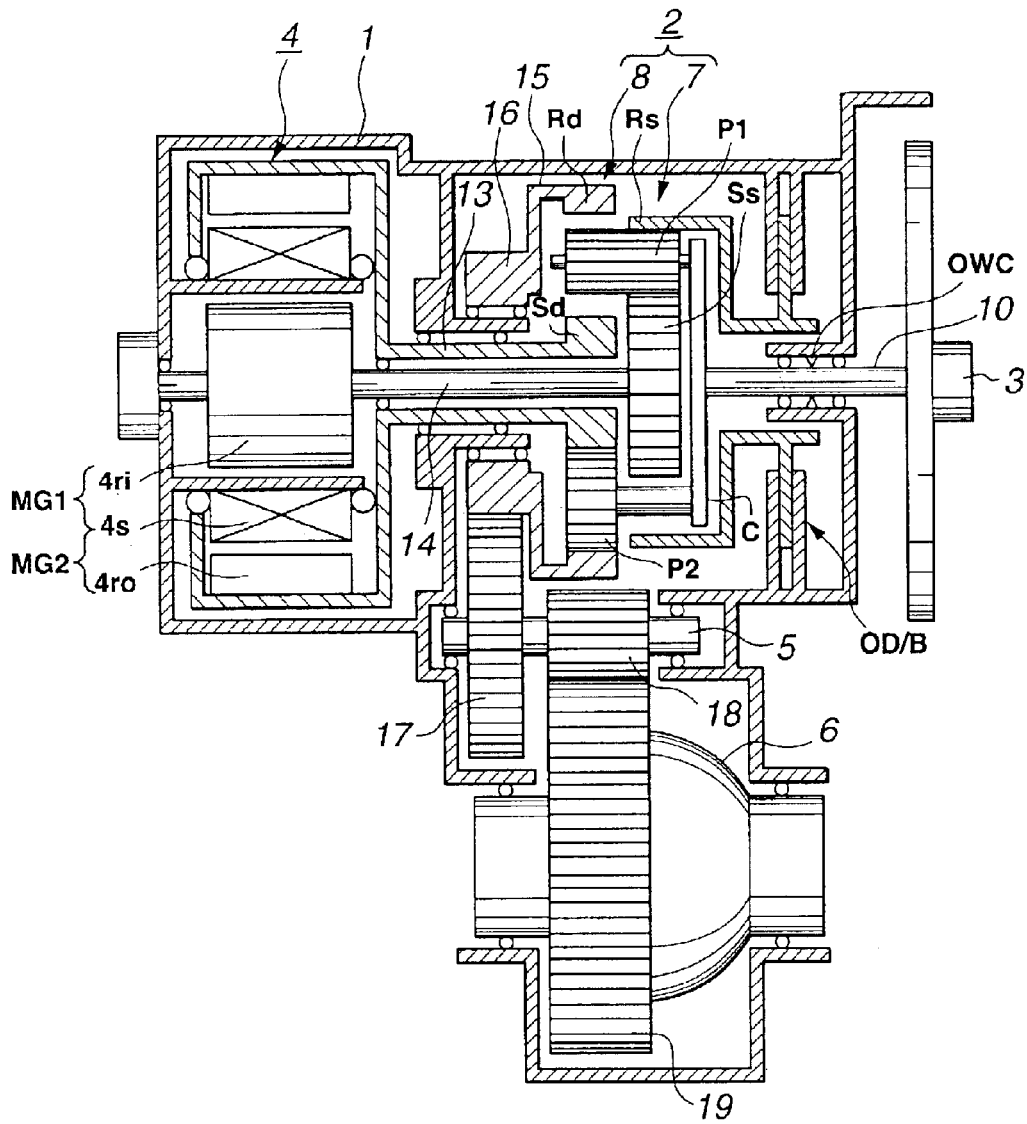
FIG. 4A is a cross-sectional view showing a fourth embodiment of the hybrid transmission according to the present invention.
Figure 4B:
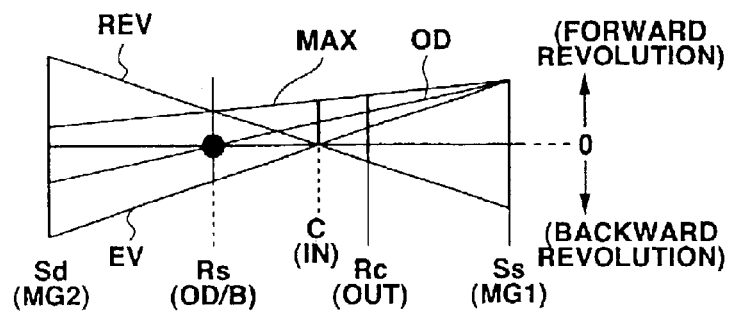
FIG. 4B is a lever diagram of the hybrid transmission of FIG. 4A.

FIG. 4A shows a fourth embodiment of the hybrid transmission according to the present invention.

Single-pinion planetary gearset 7 and double-pinion planetary gearset 8 of Ravigneaux planetary gearset 2 of this fourth embodiment are arranged as same as those of the first embodiment shown in FIG. 1A. That is, single-pinion planetary gearset 7 is disposed near engine 3, and double-pinion planetary gearset 8 is disposed apart from engine 3.

Thus arranged Ravigneaux planetary gearset 2 is connected to first and second motor/generators MG1 and MG2 such that sun gear Sd is connected to second motor/generator MG2 (outer rotor 4ro) through hollow shaft 13 and that sun gear Ss is connected to first motor/generator MG1 (inner rotor 4ro) through shaft 14 rotatably supporting hollow shaft 13. The connection relationship between the other rotating members of Ravigneaux planetary gearset 2 and elements connected to Ravigneaux planetary gearset 2 is completely the same as those in the first embodiment shown in FIG. 1A.

Accordingly, the lever diagram of the hybrid transmission shown in FIG. 4A is basically similar to that of FIG. 1B except that first and second motor/generators MG1 and MG2 are exchanged in position and operation. Therefore, the hybrid transmission of FIG. 4A performs the advantages similar to those gained by the first embodiment.

Figure 5:
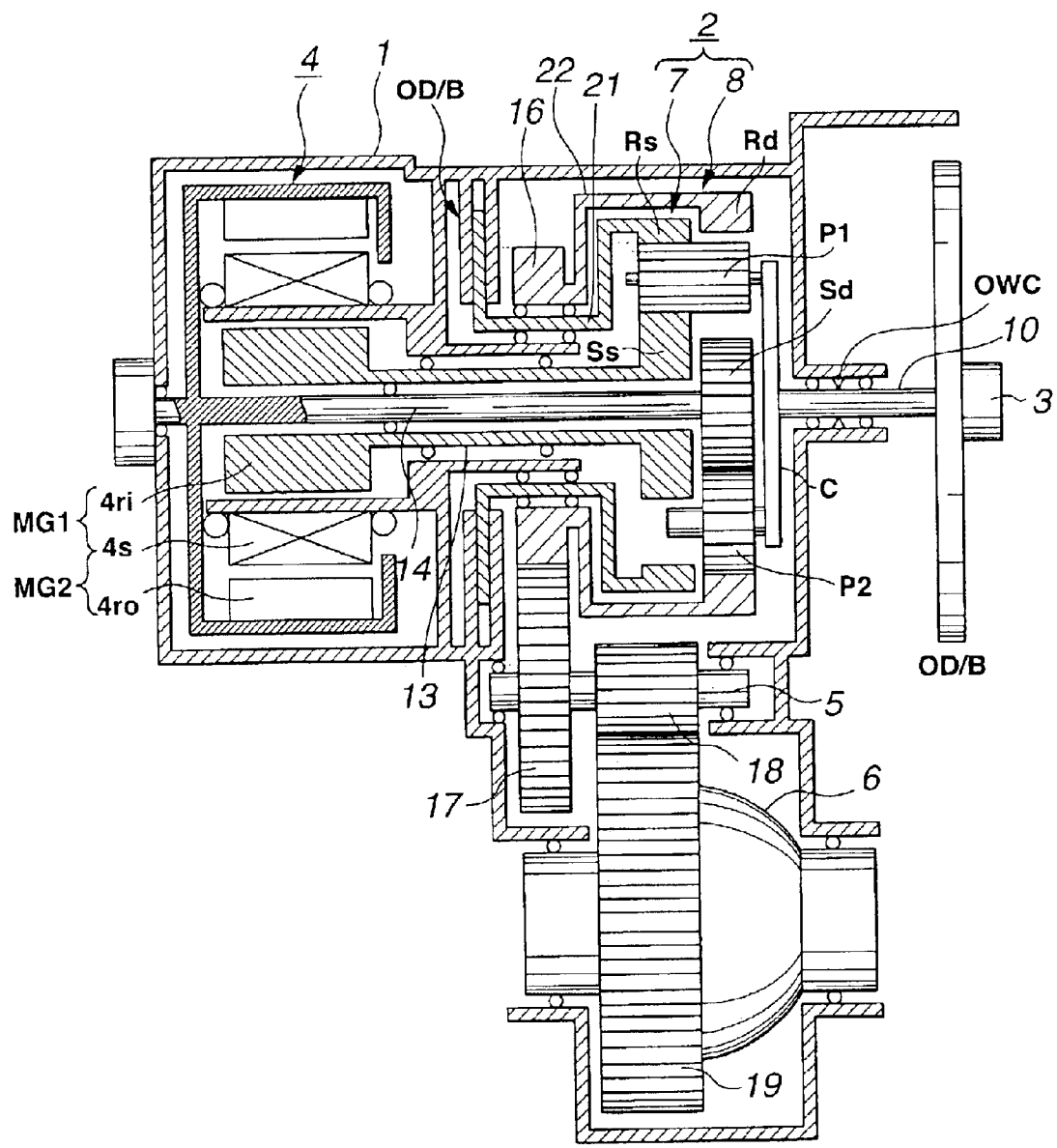
FIG. 5 is a cross-sectional view showing a fifth embodiment of the hybrid transmission according to the present invention.

FIG. 5 shows a fifth embodiment of the hybrid transmission. In this embodiment, single-pinion planetary gearset 7 and double-pinion planetary gearset 8 of Ravigneaux planetary gearset 2 are arranged as same as those of the second embodiment shown in FIG. 2 such that single-pinion planetary gearset 7 is disposed apart from engine 3, and that double-pinion planetary gearset 8 is disposed near engine 3.

Further, the connection of compound-current double-layer motor 4 to Ravigneaux planetary gearset 2 is different from that of the second embodiment shown in FIG. 2. That is, sun gear Ss is connected to first motor/generator MG1 (inner rotor 4ri) through hollow shaft 12, and sun gear Sd is connected to second motor/generator MG2 (outer rotor 4ro) through shaft 14 rotatably supporting hollow shaft 13. The connectional relationships between the other rotating members of Ravigneaux planetary gearset 2 and elements connected to Ravigneaux planetary gearset 2 is completely the same as those in the second embodiment shown in FIG. 2.

Accordingly, the lever diagram of the hybrid transmission shown in FIG. 5 is basically the same as that of FIG. 1B except that first and second motor/generators MG1 and MG2 are exchanged in position and operation. Therefore, the hybrid transmission of FIG. 5 performs the advantages similar to those gained by the first embodiment.

Figure 6A:
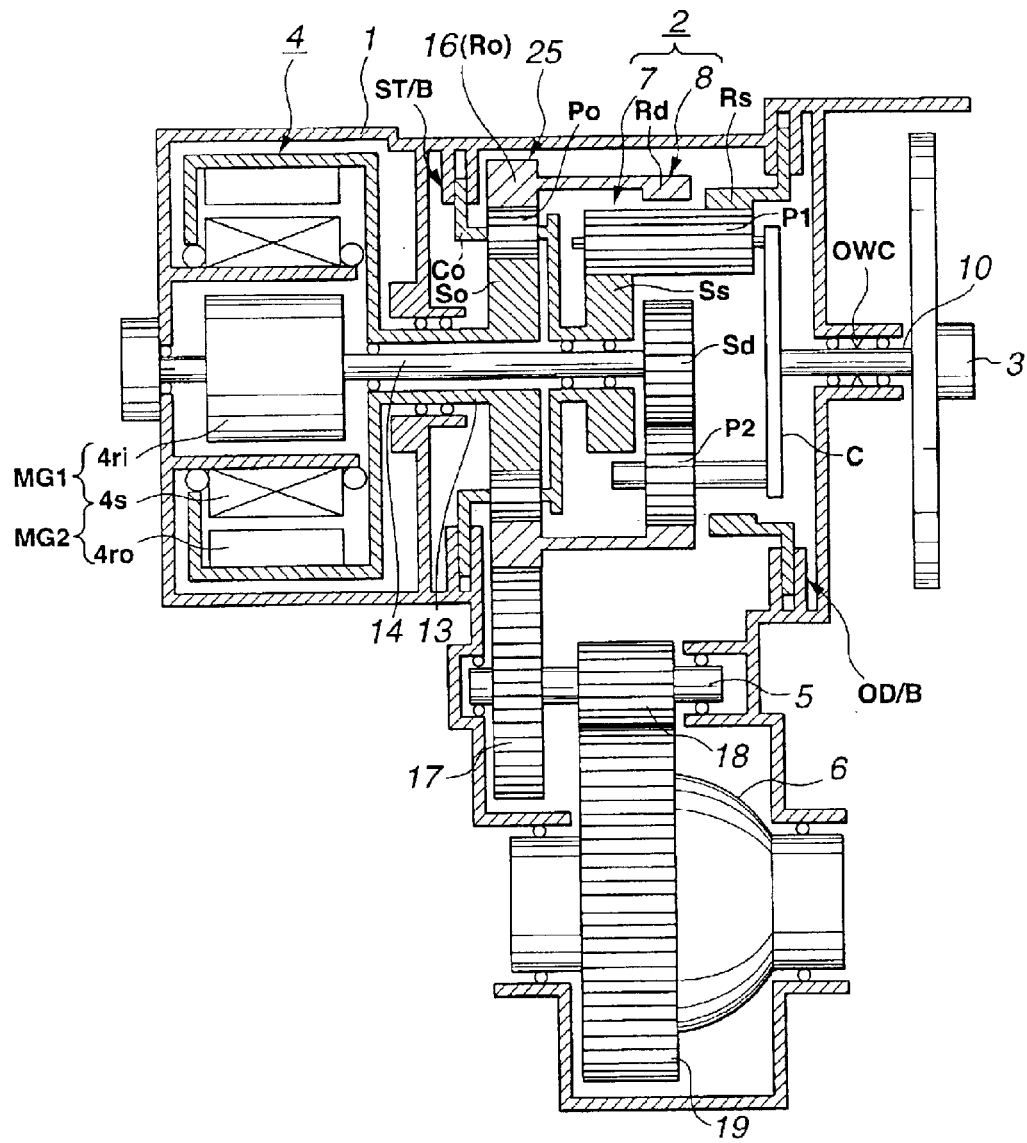
FIG. 6A is a cross-sectional view showing a sixth embodiment of the hybrid transmission according to the present invention.
Figure 6B:
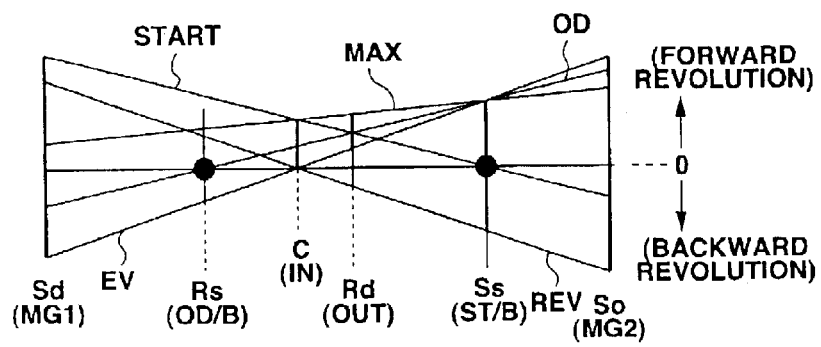
FIG. 6B is a lever diagram of the hybrid transmission of FIG. 6A.

FIGS. 6A and 6B show a sixth embodiment of the hybrid transmission according to the present invention. In this sixth embodiment, the hybrid transmission is adapted to a transaxle of a front-wheel-drive vehicle. As shown in FIG. 6A, the hybrid transmission of the sixth embodiment newly comprises a smiple planetary gearset 25 which is disposed between Ravigneaux planetary gearset 2 and a compound-current double-layer motor 4.

Double-pinion planetary gearset 8 of Ravigneaux planetary gearset 2 is located near engine 3, and single-pinion planetary gearset 7 is located apart from engine 3 as is clearly shown in FIG. 6A. Single-pinion planetary gearset 7 is configured such that pinions P1 are in mesh-engagement with sun gear Ss and ring gear Rs, and that ring gear Rs is disposed near engine 3 as compared with double-pinion planetary gearset 8 and is connected to overdrive brake OD/B (first brake). Double-pinion planetary gearset 8 comprises sun gear Sd, ring gear Rs, long pinions P1, ring gear Rd and large-diameter pinions Ps. Large-diameter pinions Ps are in mesh-engagement with sun gear Sd, ring gear Rd and long pinions P1. All of pinions P1 and P2 of planetary gearsets 7 and 8 are rotatably supported by common carrier C.

Simple planetary gear 25 added in this sixth embodiment is configured such that a plurality of pinions Po are in mesh-engagement with a sun gear So and a ring gear Ro and are rotatably supported by a carrier Co. Ring gear Ro is integrally connected to ring gear Rd, and an output gear 16 is integrally formed on an outer periphery of ring gear Ro.

Carrier Co is connected to sun gear Ss, and a start brake ST/B (second brake), which is engaged when the vehicle starts to run, is capable of properly fixing this connected member of carrier Co and sun gear Ss to stop the rotation thereof. Carrier C is connected to the crankshaft of engine 3 through transmission input shaft 10 to receive the engine revolution. Further, one-way clutch OWC is provided around the transmission input shaft 10 to prevent the revolution reverse against the engine revolution. Sun gear So is connected to second motor/generator MG2 (outer rotor 4ro) through hollow shaft 13, and sun gear Sd is connected to first motor/generator MG1 (inner rotor 4ri) through shaft 14 rotatably supporting hollow shaft 13.

Therefore, the differential apparatus constructed by the combination of Ravigneaux planetary gearset 2 and simple planetary gearset 25 is mainly constituted by six rotating members (six elements), that is, sun gear Ss, sun gear Sd, sun gear So, ring gear Rs, ring gear Rd and carrier C. When rotating conditions of two of the rotating members from six rotating members are determined, rotating conditions of all of the rotating members are determined. That is to say, the combination of Ravigneaux planetary gearset 2 and simple planetary gear 25 is a two-degree-of-freedom differential mechanism having six elements.

As is clear from a lever diagram shown in FIG. 6B, the sequence of revolution speeds of the rotating members is arranged in the sequence of sun gear Sd, ring gear Rs, carrier C, ring gear Rd, sun gear Ss and sun gear So from a high revolution speed side. Further, these rotating members arranged in the sequence of the revolution speed are connected to first motor/generator MG1, overdrive brake OD/B, input IN connected to engine 3, output OUT connected to the wheel driveline, start brake ST/B, and second motor/generator MG2, respectively.

Output gear 16 is integrally formed on an outer periphery of ring gear Ro and is in mesh-engagement with counter gear 17 integrally formed on counter shaft 5. Final-drive pinion 18 is also integrally connected to counter shaft 5 and is mesh-engaged with a final-drive ring gear 19 provided in a differential gear device 6. The transmission output revolution outputted from output gear 16 is transmitted to final differential gear device 6 through a final drive gearset constructed by final drive pinion 18 and final drive ring gear 19, and is distributed to the right and left wheels (not shown) by means of final differential device 6. This transmitting line constitutes a wheel driveline.

The hybrid transmission of the sixth embodiment achieves the shift operation represented by the lever diagram in FIG. 6B as follows.

Referring to a shift operation under a forward (right) revolution outputting state of the transmission, when the vehicle starts to run, as shown by a lever START in FIG. 6B, start brake ST/B is located opposite to input IN with respect to output OUT, and is engaged to fix sun gear Ss (carrier Co). By driving first motor/generator MG1 in the forward (right) revolution direction under this setting state, the right revolution is outputted from output OUT. Then, by properly starting engine 3, it becomes possible to drive the drive wheels by means of engine output.

When a high-side transmission ratio such as an overdrive position is selected, as shown by a lever OD on the lever diagram in FIG. 6B, the right revolution speed of output OUT is raised up by fixing ring gear Rs through the engagement operation of overdrive brake OD/B located opposite to output OUT with respect to input IN on the lever diagram and by switching the revolution state of second motor/generator MG2 from the reverse revolution state to the forward revolution speed. This arrangement enables the hybrid transmission to produce a highly-set overdrive ratio wherein the revolution speed at output OUT is higher than that at input IN.

Further the hybrid transmission realizes the overdrive transmission ratio by fixing ring gear Rs which is located opposite to output OUT through input IN in the lever diagram of FIG. 1B. That is, the overdrive transmission ratio is achieved without excessively increasing a load to first and second motor/generators MG1 and MG2 in view of a lever ratio of the lever diagram of FIG. 6B.

This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

In addition, as shown by a lever EV of the lever diagram in FIG. 6B, it is possible to obtain output power only by the operation of first and second motor/generators MG1 and MG2 without depending on engine 3. That is, the hybrid transmission according to the present invention enables the vehicle as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rs is fixed by the engagement of overdrive brake OD/B and carrier C is fixed in the reverse direction by one-way clutch OWC. This arrangement prevents the vehicle staying on an upslope from naturally moving back, and facilitates an upslope starting which can be achieved only by depressing an accelerator pedal.

When the hybrid transmission is in a shift condition represented by the lever MAX of the lever diagram in FIG. 6B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rd is raised up at the maximum revolution speed.

Further, when the hybrid transmission is in a shift condition represented by the lever REV of the lever diagram in FIG. 6B, a reverse revolution is outputted from ring gear Rd to output OUT. That is, the hybrid transmission REV is in a backward revolution (reverse revolution) output condition. Under this condition, it is possible to drive first motor/generator MG1 in the right revolution output direction and to drive second motor/generator MG1 in the reverse revolution output direction while one-way clutch OWC performs the reverse revolution preventing function.

Figure 7A:
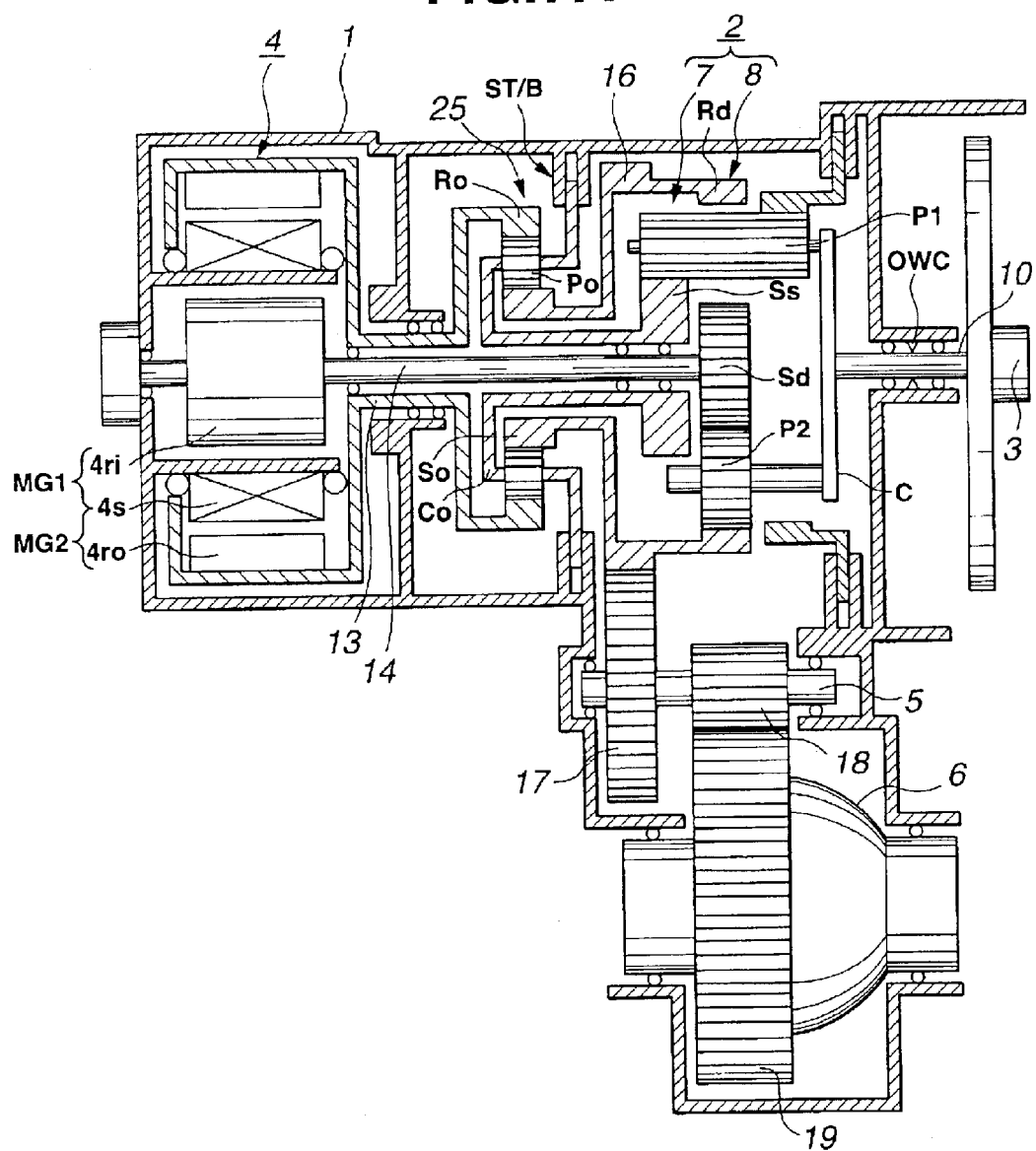
FIG. 7A is a cross-sectional view showing a seventh embodiment of the hybrid transmission according to the present invention.

FIG. 7A discloses a seventh embodiment of the hybrid transmission adapted to a transaxle for a front-engine front-drive vehicle (FF vehicle) in accordance with the present invention.

In this embodiment, single-pinion planetary gearset 7 and double-pinion planetary gearset 8 of Ravigneaux planetary gearset 2 are arranged as same as those of the sixth embodiment shown in FIG. 6A. Further, a smiple planetary gearset 25 is disposed between Ravigneaux planetary gearset 2 and a compound-current double-layer motor 4.

Simple planetary gearset 25 and Ravigneaux planetary gearset 2 are combinated as follows.

Ring gear Rs of single-pinion planetary gearset 7 is disposed at a nearer-side of engine 3 as compared with double-pinion planetary gearset 8 as is similar to the arrangement shown in FIG. 6A, and is connected to overdrive brake OD/B (first brake). Ring gear Rd of double-pinion planetary gearset 25 is integrally connected to sun gear So, and output gear 16 is integrally formed on an outer periphery of the integrally connected member of ring gear Rd and sun gear So, so that output gear 16 is disposed at an outer periphery of Ravigneaux planetary gearset 2. Carrier Co is connected to sun gear Ss, and a start brake ST/B (second brake), which is engaged when the vehicle starts running, is capable of properly fixing this connected member of carrier Co and sun gear Ss to stop the rotation thereof. Carrier C is connected to the crankshaft of engine 3 through transmission input shaft 10 to receive the engine revolution as is similar to FIG. 6A. Further, one-way clutch OWC is provided around the transmission input shaft 10 to prevent the revolution reverse against the engine revolution. Ring gear Ro is connected to second motor/generator MG2 (outer rotor 4ro) through hollow shaft 13, and sun gear Sd is connected to first motor/generator MG1 (inner rotor 4ri) through shaft 14 rotatably supporting hollow shaft 13.

Therefore, the differential apparatus constructed by the combination of Ravigneaux planetary gearset 2 and simple planetary gearset 25 is mainly constituted by six rotating members (six elements) of sun gear Ss, sun gear Sd, ring gear Rs, ring gear Rd, ring gear Ro and carrier C. When rotating conditions of two of the rotating members from six rotating members are determined, rotating conditions of all of the rotating members are determined. That is to say, the combination of Ravigneaux planetary gearset 2 and simple planetary gear 25 is a two-degree-of-freedom differential mechanism having six elements.

Figure 7B:
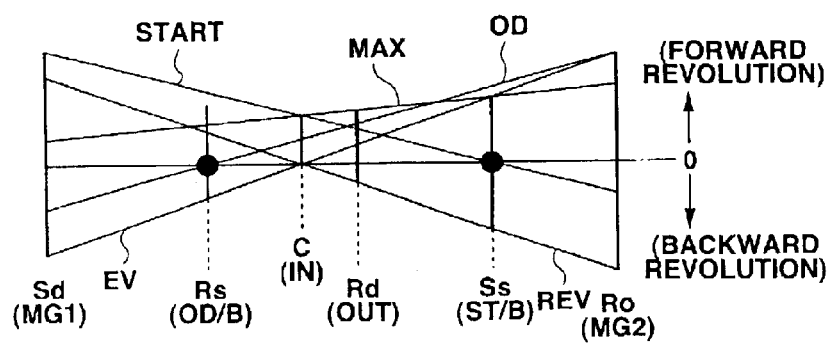
FIG. 7B is a lever diagram of the hybrid transmission of FIG. 7A.

As is clear from the lever diagram shown in FIG. 7B, the sequence of revolution speeds of the rotating members is arranged in the sequence of sun gear Sd, ring gear Rs, carrier C, ring gear Rd, sun gear Ss and ring gear Ro from a high revolution speed side. Further, these rotating members arranged in the sequence of the revolution speed are connected to first motor/generator MG1, overdrive brake OD/B, input IN connected to engine 3, output OUT connected to the wheel driveline, start brake ST/B, and second motor/generator MG2, respectively.

The wheel driveline connected to output gear 16 is constructed as is similar to the construction shown in FIG. 6A. That is, output gear 16 is in mesh-engagement with counter gear 17 integrally formed on counter shaft 5. Final-drive pinion 18 is also integrally connected to counter shaft 5 and is mesh-engaged with a final-drive ring gear 19 provided in a differential gear device 6.

Accordingly, the transmission output revolution outputted from output gear 16 is transmitted to final differential gear device 6 through a final drive gearset constructed by final drive pinion 18 and final drive ring gear 19, and is distributed to the right and left wheels (not shown) by means of final differential device 6. This transmitting line constitutes a wheel driveline.

The hybrid transmission of the seventh embodiment achieves the shift operation represented by the lever diagram in FIG. 7B as follows.

Referring to a shift operation under a forward (right) revolution outputting state of the transmission, when the vehicle starts to run, as shown by a lever START in FIG. 7B, start brake ST/B is located opposite to input IN with respect to output OUT and is put in the engaged state to fix sun gear Ss (carrier Co). By driving first motor/generator MG1 in the forward (right) revolution direction under this setting state, the right revolution is outputted from output OUT. Then, by properly starting engine 3, it becomes possible to drive the drive wheels by means of engine output.

When a high-side transmission ratio such as an overdrive position is selected, as shown by a lever OD on the lever diagram in FIG. 7B, the right revolution speed of output OUT is raised up by fixing ring gear Rs through the engagement operation of overdrive brake OD/B located opposite to output OUT with respect to input IN on the lever diagram and by switching the revolution state of second motor/generator MG2 from the reverse revolution state to the forward revolution speed. This arrangement enables the hybrid transmission to produce a highly-set overdrive ratio wherein the revolution speed at output OUT is higher than that at input IN.

Further the hybrid transmission realizes the overdrive transmission ratio by fixing ring gear Rs which is located opposite to output OUT through input IN in the lever diagram of FIG. 7B. That is, the overdrive transmission ratio is achieved without excessively increasing a load to first and second motor/generators MG1 and MG2 in view of a lever ratio of the lever diagram of FIG. 7B.

This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

In addition, as shown by a lever EV of the lever diagram in FIG. 7B, it is possible to obtain output power only by the operation of first and second motor/generators MG1 and MG2 without depending on engine 3. That is, the hybrid transmission according to the present invention enables the vehicle as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rs is fixed by the engagement of overdrive brake OD/B and carrier C is fixed in the reverse direction by one-way clutch OWC. This arrangement prevents the vehicle stopped on an upslope from naturally moving back, and facilitates an upslope starting which can be achieved only by depressing an accelerator pedal.

When the hybrid transmission is in a shift condition represented by the lever MAX of the lever diagram in FIG. 7B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rd is raised up at the maximum revolution speed.

Further, when the hybrid transmission is in a shift condition represented by the lever REV of the lever diagram in FIG. 7B, a reverse revolution is outputted from ring gear Rd to output OUT. That is, the hybrid transmission REV is in a backward revolution (reverse revolution) output condition. Under this condition, it is possible to drive first motor/generator MG1 in the right revolution output direction and to drive second motor/generator MG2 in the reverse revolution output direction while one-way clutch OWC performs the reverse revolution preventing function.

Figure 8A:
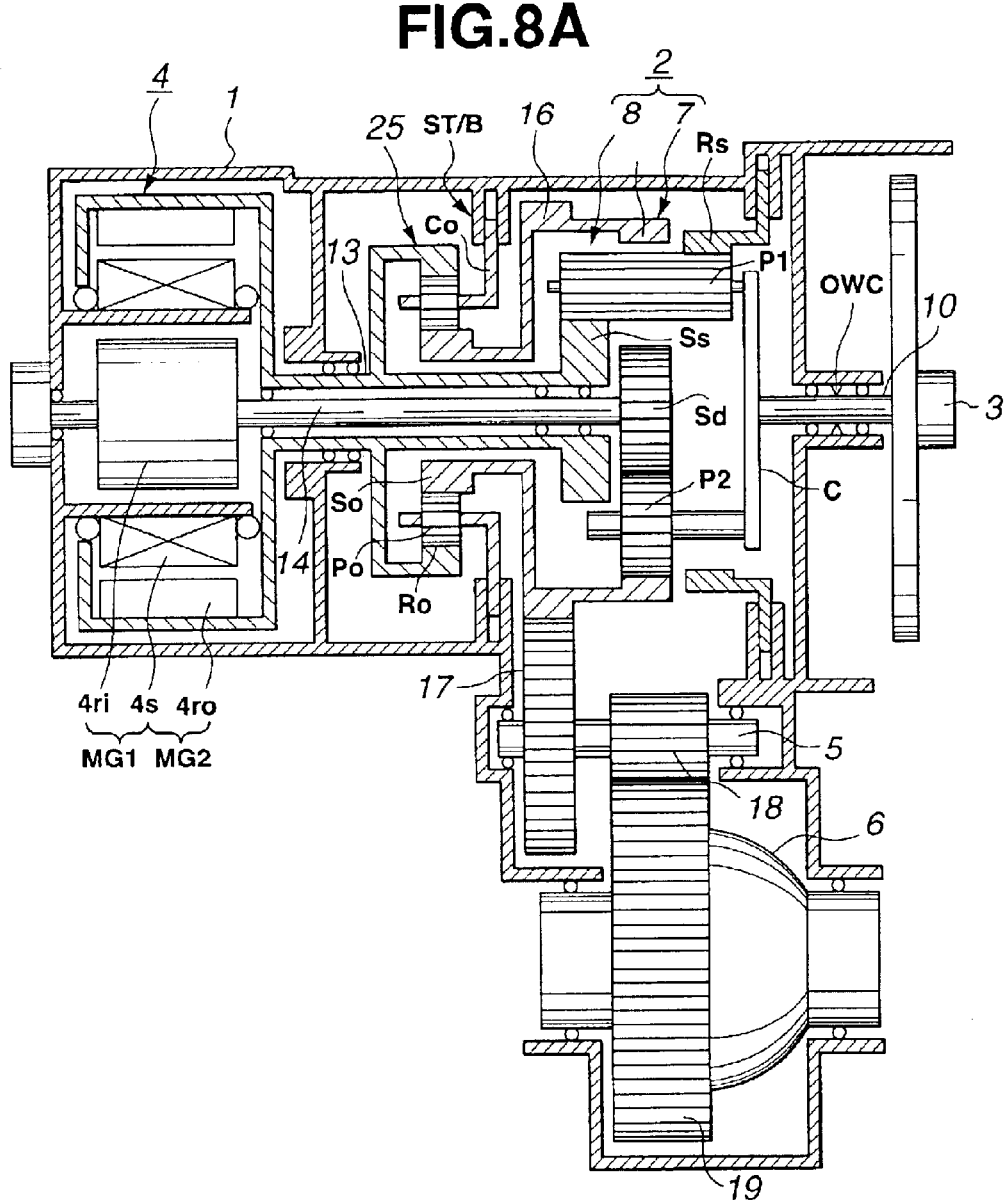
FIG. 8A is a cross-sectional view showing an eighth embodiment of the hybrid transmission according to the present invention.
Figure 8B:
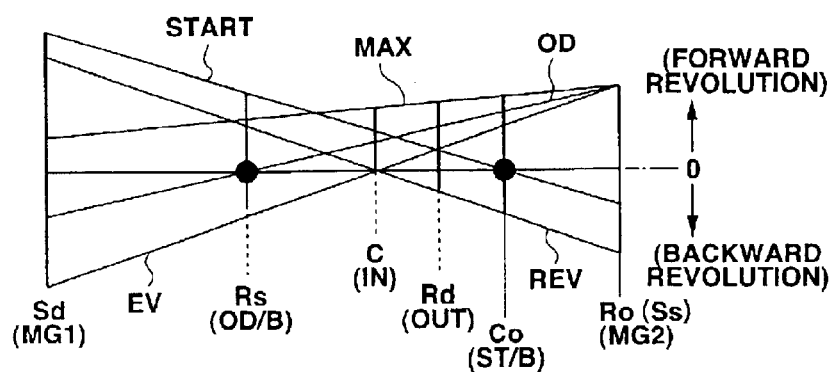
FIG. 8B is a lever diagram of the hybrid transmission of FIG. 8A.

FIGS. 8A and 8B show an eighth embodiment of the hybrid transmission according adapted to a transaxle for a front-engine front-drive vehicle (FF vehicle) in accordance with the present invention.

In this embodiment, single-pinion planetary gearset 7 and double-pinion planetary gearset 8 of Ravigneaux planetary gearset 2 are arranged as same as those of the sixth embodiment shown in FIG. 6A. Further, a smiple planetary gearset 25 is disposed between Ravigneaux planetary gearset 2 and a compound-current double-layer motor 4.

Simple planetary gearset 25 and Ravigneaux planetary gearset 2 are combinated as follows.

Ring gear Rs of single-pinion planetary gearset 7 is disposed at a nearer-side of engine 3 as compared with double-pinion planetary gearset 8 as is similar to the arrangement shown in FIG. 6A, and is connected to overdrive brake OD/B (first brake). Ring gear Rd of double-pinion planetary gearset 8 is integrally connected to sun gear So, and output gear 16 is integrally formed on an outer periphery of the integrally connected member of ring gear Rd and sun gear So, so that output gear 16 is disposed at an outer periphery of Ravigneaux planetary gearset 2.

Start brake ST/B (second brake), which is engaged when the vehicle starts running, is capable of properly fixing this connected member of carrier Co and sun gear Ss to stop the rotation thereof. Carrier C is connected to the crankshaft of engine 3 through transmission input shaft 10 to receive the engine revolution as is similar to FIG. 6A. Further, one-way clutch OWC is provided around the transmission input shaft 10 to prevent the revolution reverse against the engine revolution. Ring gear Ro, sun gear Ss and second motor/generator MG2 (outer rotor 4ro) are integrally connected through hollow shaft 13, and sun gear Sd is connected to first motor/generator MG1 (inner rotor 4ri) through shaft 14 rotatably supporting hollow shaft 13.

Therefore, the differential apparatus constructed by the combination of Ravigneaux planetary gearset 2 and simple planetary gearset 25 is mainly constituted by six rotating members (six elements) of sun gear Ss, sun gear Sd, ring gear Rs, ring gear Rd, ring gear Ro and carrier C. When rotating conditions of two of the rotating members from six rotating members are determined, rotating conditions of all of the rotating members are determined. That is to say, the combination of Ravigneaux planetary gearset 2 and simple planetary gear 25 is a two-degree-of-freedom differential mechanism having six elements.

As is clear from the lever diagram shown in FIG. 8B, the sequence of revolution speeds of the rotating members is arranged in the sequence of sun gear Sd, ring gear Rs, carrier C, ring gear Rd, carrier Co and ring gear Ro from a high revolution speed side. Further, these rotating members arranged in the sequence of the revolution speed are connected to first motor/generator MG1, overdrive brake OD/B, input IN connected to engine 3, output OUT connected to the wheel driveline, start brake ST/B, and second motor/generator MG2, respectively.

The wheel driveline connected to output gear 16 is constructed as is similar to the construction shown in FIGS. 6A and 7A. That is, output gear 16 is in mesh-engagement with counter gear 17 integrally formed on counter shaft 5.

The hybrid transmission of the seventh embodiment achieves the shift operation represented by the lever diagram in FIG. 8B as follows.

Referring to a shift operation under a forward.(right) revolution outputting state of the transmission, when the vehicle starts to run, as shown by the lever START in FIG. 8B, start brake ST/B which is disposed opposite to input IN with respect to output OUT in the lever diagram, is engaged to fix carrier Co. By driving first motor/generator MG1 in the forward (right) revolution direction under this setting state, the right revolution is outputted from output OUT. Then, by properly starting engine 3, it becomes possible to drive the drive wheels by means of engine output.

When a high-side transmission ratio such as an overdrive position is selected, as shown by a lever OD on the lever diagram in FIG. 7B, the right revolution speed of output OUT is raised up by fixing ring gear Rs through the engagement operation of overdrive brake OD/B located opposite to output OUT with respect to input IN on the lever diagram and by switching the revolution state of second motor/generator MG2 from the reverse revolution state to the forward revolution speed. This arrangement enables the hybrid transmission to produce a highly-set overdrive ratio wherein the revolution speed at output OUT is higher than that at input IN.

Further the hybrid transmission realizes the overdrive transmission ratio by fixing ring gear Rs which is located opposite to output Out through input IN in the lever diagram of FIG. 8B. That is, the overdrive transmission ratio is achieved without excessively increasing a load to first and second motor/generators MG1 and MG2 in view of a lever ratio of the lever diagram of FIG. 8B. This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

In addition, as shown by a lever EV of the lever diagram in FIG. 8B, it is possible to obtain output power only by the operation of first and second motor/generators MG1 and MG2 without depending on engine 3. That is, the hybrid transmission according to the present invention enables the vehicle as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rs is fixed by the engagement of overdrive brake OD/B and carrier C is fixed in the reverse direction by one-way clutch OWC. This arrangement prevents the vehicle staying on an upslope from naturally moving back, and facilitates an upslope starting which can be achieved only by depressing an accelerator pedal.

When the hybrid transmission is in a shift condition represented by the lever MAX of the lever diagram in FIG. 7B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rd is raised up at the maximum revolution speed. Further, when the hybrid transmission is in a shift condition represented by the lever REV of the lever diagram in FIG. 8B, a reverse revolution is outputted from ring gear Rd to output OUT. That is, the hybrid transmission is put in a backward revolution (reverse revolution) output condition. Under this condition, it is possible to drive first motor/generator MG1 in the right revolution output direction and to drive second motor/generator MG2 in the reverse revolution output direction while one-way clutch OWC performs the reverse revolution preventing function.

Figure 9A:
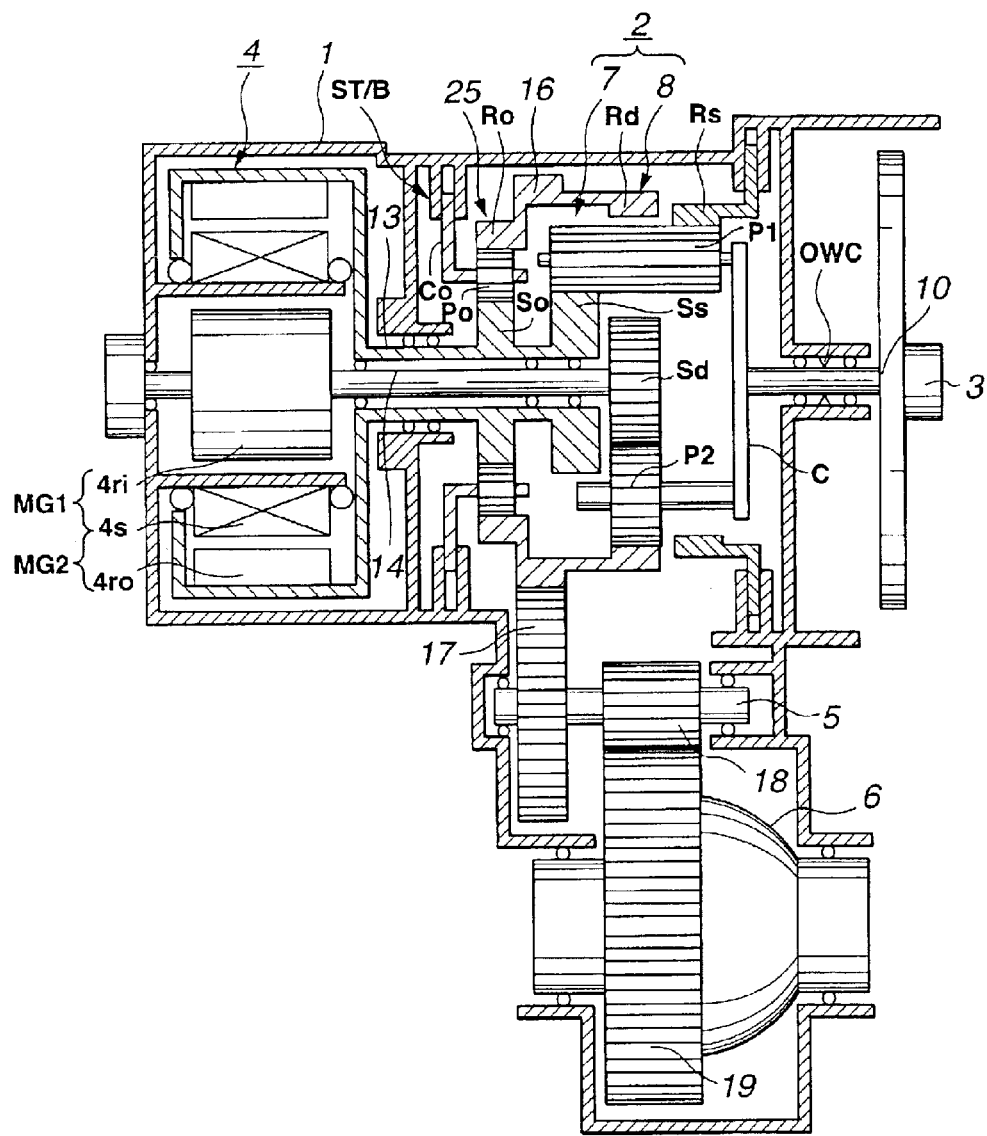
FIG. 9A is a cross-sectional view showing a ninth embodiment of the hybrid transmission according to the present invention.
Figure 9B:
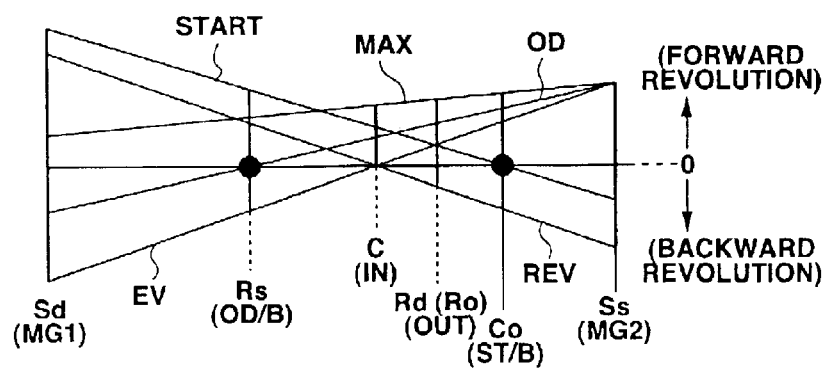
FIG. 9B is a lever diagram of the hybrid transmission of FIG. 9A.

FIGS. 9A and 9B show a ninth embodiment of the hybrid transmission according adapted to a transaxle for a front-engine front-drive vehicle (FF vehicle) in accordance with the present invention.

In this embodiment, single-pinion planetary gearset 7 and double-pinion planetary gearset 8 of Ravigneaux planetary gearset 2 are arranged as same as those of the sixth embodiment shown in FIG. 6A. Further, smiple planetary gearset 25 is disposed between Ravigneaux planetary gearset 2 and a compound-current double-layer motor 4.

Simple planetary gearset 25 and Ravigneaux planetary gearset 2 are combined as follows.

Ring gear Rs of single-pinion planetary gearset 7 is disposed at a nearer-side of engine 3 as compared with double-pinion planetary gearset 8 as is similar to the arrangement shown in FIG. 6A, and is connected to overdrive brake OD/B (first brake). Ring gear Rd of double-pinion planetary gearset 25 is integrally connected to ring gear Ro of simple planetary gear 25, and output gear 16 is integrally formed on an outer periphery of the integrally connected member of ring gear Rd and sun gear So, so that output gear 16 is disposed at an outer periphery of Ravigneaux planetary gearset 2.

Start brake ST/B (second brake) to be engaged when the vehicle starts to run is capable of properly fixing this connected member of carrier Co and sun gear Ss to stop the rotation thereof. Carrier C is connected to the crankshaft of engine 3 through transmission input shaft 10 to receive the engine revolution as is similar to FIG. 6A. Further, one-way clutch OWC is provided around the transmission input shaft 10 to prevent the revolution reverse against the engine revolution. Sun gear So, sun gear Ss and second motor/generator MG2 (outer rotor 4ro) are integrally connected through hollow shaft 13, and sun gear Sd is connected to first motor/generator MG1 (inner rotor 4ri) through shaft 14 rotatably supporting hollow shaft 13.

Therefore, the differential apparatus constructed by the combination of Ravigneaux planetary gearset 2 and simple planetary gearset 25 is mainly constituted by six rotating members (six elements) of sun gear Ss, sun gear Sd, ring gear Rs, ring gear Rd (Ro), carrier C and carrier Co.

When rotating conditions of two of the rotating members from six rotating members are determined, rotating conditions of all of the rotating members are determined. That is to say, the combination of Ravigneaux planetary gearset 2 and simple planetary gear 25 is a two-degree-of-freedom differential mechanism having six elements.

As is clear from the lever diagram shown in FIG. 9B, the sequence of revolution speeds of the rotating members is arranged in the sequence of sun gear Sd, ring gear Rs, carrier C, ring gear Rd (ring gear Ro), carrier Co and sun gear Ss from a high revolution speed side. Further, these rotating members arranged in the sequence of the revolution speed are connected to first motor/generator MG1, overdrive brake OD/B, input IN connected to engine 3, output OUT connected to the wheel driveline, start brake ST/B, and second motor/generator MG2, respectively.

The wheel driveline connected to output gear 16 is constructed as is similar to the construction shown in FIGS. 6A, 7A and 8A. That is, output gear 16 is in mesh-engagement with counter gear 17 integrally formed on counter shaft 5.

The hybrid transmission of the ninth embodiment achieves the shift operation represented by the lever diagram in FIG. 9B as follows.

Referring to a shift operation under a forward (right) revolution outputting state of the transmission, when the vehicle starts to run, as shown by a lever START in FIG. 9B, start brake ST/B which is disposed opposite to input IN with respect to output OUT in the lever diagram, is engaged to fix carrier Co. By driving first motor/generator MG1 in the forward (right) revolution direction under this setting state, the right revolution is outputted from output OUT. Then, by properly starting engine 3, it becomes possible to drive the drive wheels by means of engine output.

When a high-side transmission ratio such as an overdrive position is selected, as shown by a lever OD on the lever diagram in FIG. 9B, the right revolution speed of output OUT is raised up by fixing ring gear Rs through the engagement operation of overdrive brake OD/B located opposite to output OUT with respect to input IN on the lever diagram and by switching the revolution state of second motor/generator MG2 from the reverse revolution state to the forward revolution speed. This arrangement enables the hybrid transmission to produce a highly-set overdrive ratio wherein the revolution speed at output OUT is higher than that at input IN.

Further the hybrid transmission realizes the overdrive transmission ratio by fixing ring gear Rs which is located opposite to output OUT through input IN in the lever diagram of FIG. 9B. That is, the overdrive transmission ratio is achieved without excessively increasing a load to first and second motor/generators MG1 and MG2 in view of a lever ratio of the lever diagram of FIG. 9B.

This overdrive transmission ratio by this arrangement does not require increasing the capacity of first and second motor/generators MG1 and MG2, and enables the improvement of fuel consumption by the proper selection of the high-speed side transmission ratio, while avoiding the influence to the fuel consumption.

In addition, as shown by a lever EV of the lever diagram in FIG. 9B, it is possible to obtain output power only by the operation of first and second motor/generators MG1 and MG2 without depending on engine 3. That is, the hybrid transmission according to the present invention enables the vehicle as an electric vehicle.

Further, by engaging overdrive brake OD/B when the vehicle operating in an electric vehicle mode stops to run, output OUT to the wheel driveline is stopped by the reverse revolution preventing function of one-way clutch OWC, that is, ring gear Rs is fixed by the engagement of overdrive brake OD/B and carrier C is fixed in the reverse direction by one-way clutch OWC. This arrangement prevents the vehicle staying on an upslope from naturally moving back, and facilitates an upslope starting which can be achieved only by depressing an accelerator pedal.

When the hybrid transmission is in a shift condition represented by the lever MAX of the lever diagram in FIG. 9B, forward revolution speeds of first and second motor/generators MG1 and MG2 are raised up as possible, and the revolution speed of engine 3 (corresponding to input IN) is also raised up as possible. Therefore, under this shift condition, the revolution speed at output OUT of ring gear Rd is raised up at the maximum revolution speed.

Further, when the hybrid transmission is in a shift condition represented by the lever REV of the lever diagram in FIG. 9B, a reverse revolution is outputted from ring gear RD to output OUT. That is, the hybrid transmission REV is in a backward revolution (reverse revolution) output condition. Under this condition, it is possible to drive first motor/generator MG1 in the right revolution output direction and to drive second motor/generator MG2 in the reverse revolution output direction while one-way clutch OWC performs the reverse revolution preventing function.

Although the embodiments according to the present invention have been shown and described to employ compound-current double-layer motor 4 as first and second motor/generators MG1 and MG2, the invention is not limited to this and other type of motor/generators may be employed. For example, first motor/generator MG1 and second motor/generator MG2 may be arranged not to be coaxial such that an axis of MG1 is not coincident with the axis of MG2.

The engagement control and disengagement control of overdrive brake OD/B, which are respectively shown in FIGS. 10 and 11 and explained in the first embodiment, are also adapted to the second through ninth embodiment and gain the advantaged as same as those gained in the first embodiment.

Throughout the first through ninth embodiments, by controlling first and second motor/generators MG1 and MG2 to generate no torque during when overdrive brake OD/B is in the engaged state, it becomes possible to ensure the overdrive gear ratio only by the output of engine 3 in a manner of fixing ring gear Rs relating to overdrive brake OD/B. This improves the fuel consumption performance.

This application is based on Japanese Patent Application No. 2002-175980 filed on Jun. 17, 2002 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A hybrid transmission for a hybrid vehicle, comprising:
   a differential mechanism including at least five rotating members, the rotating members being interlinked so that rotating conditions of all of the rotating members are determined when rotating conditions of two of the rotating members are determined, five of the rotating members being connected to an input from a main power source, an output to a driveline, first and second mover/generators and a brake, respectively;

wherein the fastest rotating member and the slowest rotating members is connected to the first and second motor/generators, respectively, when the rotating members are revolving with a revolution speed difference, wherein the revolution speeds of the rotating members connected to the brake, the input and the output are between the revolution speeds of the rotating members connected repectively to the first and second motor/generators, the brake is capable of being put in an engaged state to brake the rotating members, and wherein an absolute value of a revolution speed of the rotating member connected to the output is greater than an absolute value of a revolution speed of the rotating member connected to the input when the brake is put in the engaged state.

2. The hybrid transmission as claimed in claim 1, wherein the differential mechanism is constructed by a Ravigneaux planetary gearset which is a combination of a single-pinion planetary gearset and a double-pinion planetary gearset, a common carrier of the Ravigneaux planetary gearset being connected to the input of the main power source, one of a ring gear of the single-pinion planetary gearset and a ring gear of the double-pinion planetary gearset being connected to the brake.

3. A hybrid transmission for a hybrid vehicle, comprising:
a two-degree-of-freedom differential mechanism including at least five rotating members, five of the rotating members being interlinked so that rotating conditions of all of the rotating members are determined when rotating conditions of two of the rotating members are determined,
five of the rotating members being connected to a first motor/generator, one of a brake and an output to a driveline, an input from a main power source, the other of the brake and the output to the driveline, and a second motor/generator, respectively, such that the rotating member revolving at the highest revolution speed is connected to one of the first and second motor/generator and the rotating member revolving at the lowest revolution speed is connected to the other of the first and second motor/generators, when the rotating members are revolving with a revolution speed difference;
wherein an absolute value of a revolution speed of the rotating member connected to the output is greater than an absolute value of the revolution speed of the rotating member connected to the input when the brake is put in the engaged state.

4. The hybrid transmission as claimed in claim 3, wherein the differential mechanism is constructed by a Ravigneaux planetary gearset which is a combination of a single-pinion planetary gearset and a double-pinion planetary gearset, the single-pinion planetary gearset being disposed between the input and the double-pinion planetary gearset, a common carrier of the Ravigneaux planetary gearset being connected to the input of the main power source, a sun gear of the single-pinion planetary gearset being connected to one of the first and second motor/generators, a sun gear of the double-pinion planetary gearset being connected to the other of the first and second motor/generator, a ring gear of the single-pinion planetary gearset being connected to the brake, a ring gear of the double-pinion planetary gearset being connected to the output.

5. The hybrid transmission as claimed in claim 3, wherein the differential mechanism is constructed by a Ravigneaux planetary gearset which is a combination of a single-pinion planetary gearset and a double-pinion planetary gearset, the double-pinion planetary gearset being disposed between the input and the single-pinion planetary gearset, a common carrier of the Ravigneaux planetary gearset being connected to the input of the main power source, a sun gear of the single-pinion planetary gearset being connected to one of the first and second motor/generators, a sun gear of the double-pinion planetary gearset being connected to the other of the first and second motor/generators, a ring gear of the single-pinion planetary gearset being connected to the brake through an axial portion extending from the ring gear of the single-pinion planetary gearset toward the first and second motor/generators, a ring gear of the double-pinion planetary gearset being connected to the output.

6. The hybrid transmission as claimed in claim 3, wherein the differential mechanism is constructed by a Ravigneaux planetary gearset which is a combination of a single-pinion planetary gearset and a double-pinion planetary gearset, a common carrier of the Ravigneaux planetary gearset being connected to the input of the main power source, the double-pinion planetary gearset being disposed at a position nearer to the input than the single-pinion planetary gearset, a sun gear of the single-pinion planetary gearset being connected to one of the first and second motor/generators, a sun gear of the double-pinion planetary gearset being connected to the other of the first and second motor/generators, a ring gear of the double-pinion planetary gearset being connected to the brake, a ring gear of the single-pinion planetary gearset being connected to the output.

7. A hybrid transmission for a hybrid vehicle, comprising:
a two-degree-of-freedom differential mechanism including at least six rotating members, the rotating members being interlinked so that rotating conditions of all of the rotating members are determined when rotating conditions of two of the rotating members are determined, six of the rotating members being connected to a second motor/generator, a first brake, an input from a main power source, an output to the driveline, a second brake and a first motor/generator, respectively, such that the rotating member revolving at the highest revolution speed is connected to one of the first and second motor/generator and the rotating member revolving at the lowest revolving speed is connected to the other of the first and second motor/generators, when the rotating members are revolving with a revolution difference,
wherein the revolution speeds of the rotating members connected to the brake, the input and the output are between the revolution speeds of the rotating members connected respectively to the first and second motor/generators, and
wherein an absolute value of the revolution speed of the rotating member connected to the output is greater than an absolute value of the revolution speed of the rotating member connected to the input when the brake is put in the engaged state.

8. The hybrid transmission as claimed in claim 7, wherein the differential mechanism is constructed by a simple planetary gearset and a Ravigneaux planetary gearset which is a combination of a single-pinion planetary gearset and a double-pinion planetary gearset, a common carrier of the Ravigneaux planetary gearset being connected to the input of the main power source, a sun gear of the double-pinion planetary gearset being connected to the first motor/generator, a sun gear of the simple planetary gearset being connected to the second motor/generator, a ring gear of the single-pinion planetary gearset being connected to the first brake, a ring gear of the double-pinion planetary gearset being integrally connected to a ring gear of the simple planetary gearset, the ring gear of the double-pinion planetary gearset being connected to the output, a sun gear of the single-pinion planetary gearset being integrally connected to a carrier of the simple planetary gearset, the sun gear of the single-pinion planetary gearset being connected to the second brake.

9. The hybrid transmission as claimed in claim 7, wherein the differential mechanism is constructed by a simple planetary gearset and a Ravigneaux planetary gearset which is a combination of a single-pinion planetary gearset and a double-pinion planetary gearset, a common carrier of the Ravigneaux planetary gearset being connected to the input of the main power source, a sun gear of the double-pinion planetary gearset being connected to the first motor/generator, a ring gear of the simple planetary gearset being connected to the second motor/generator, a ring gear of the single-pinion planetary gearset being connected to the first brake, a ring gear of the double-pinion planetary gearset being integrally connected to a sun gear of the simple planetary gearset, the ring gear of the double-pinion planetary gearset being connected to the output, a sun gear of the single-pinion planetary gearset being integrally connected to a carrier of the simple planetary gearset, the sun gear of the single-pinion planetary gearset being connected to the second brake.

10. The hybrid transmission as claimed in claim 7, wherein the differential mechanism is constructed by a simple planetary gearset and a Ravigneaux planetary gearset which is a combination of a single-pinion planetary gearset and a double-pinion planetary gearset, a common carrier of the Ravigneaux planetary gearset being connected to the input of the main power source, a sun gear of the double-pinion planetary gearset being connected to the first motor/generator, a sun gear of the single-pinion planetary gearset being integrally connected to a ring gear of the simple planetary gear, the sun gear of the single-pinion planetary gearset being connected to the second motor/generator, a ring gear of the single-pinion planetary gearset being connected to the first brake, a ring gear of the double-pinion planetary gearset being integrally connected to a sun gear of the simple planetary gearset, the ring gear of the double-pinion planetary gearset being connected to the output, a carrier of the simple planetary gearset being connected to the second brake.

11. The hybrid transmission as claimed in claim 7, wherein the differential mechanism is constructed by a simple planetary gearset and a Ravigneaux planetary gearset which is a combination of a single-pinion planetary gearset and a double-pinion planetary gearset, a common carrier of the Ravigneaux planetary gearset being connected to the input of the main power source, a sun gear of the double-pinion planetary gearset being connected to the first motor/generator, a sun gear of the single-pinion planetary gearset being integrally connected to a sun gear of the simple planetary gear, the sun gear of the single-pinion planetary gearset being connected to the second motor/generator, a ring gear of the single-pinion planetary gearset being connected to the first brake, a ring gear of the double-pinion planetary gearset being integrally connected to a ring gear of the simple planetary gearset, the ring gear of the double-pinion planetary gearset being connected to the output, a carrier of the simple planetary gearset being connected to the second brake.

12. The hybrid transmission as claimed in claim 1, wherein the brake adjacent to the input of the main power source is put in the engaged state when a demanded revolution speed at the output is higher than the revolution speed of the input of the main power source.

13. The hybrid transmission as claimed in claim 1, wherein at least one of the first and second motor/generators is controlled so that a revolution speed of the rotating member connected to the brake is maintained at zero when the brake is engaged or disengaged.

14. The hybrid transmission as claimed in claim 1, wherein the first and second motor/generators are controlled so that a torque generated by each of the first and second motor/generators becomes zero when the brake is engaged.

15. The hybrid transmission as claimed in claim 1, further comprising a one-way clutch for preventing a reverse revolution of the main power source from being supplied, wherein the brake is engaged when the vehicle stops running under an electric-vehicle traveling mode wherein the vehicle travels only by the driving power of the first and second motor/generators.

16. A hybrid transmission for a hybrid vehicle, comprising:

differential revolution generating means for generating a difference between a revolution speed of a rotating member connected to an input from a main power source and a revolution speed of a rotating member connected to an output to a driveline by employing at least five rotating members which are interlinked so that rotating conditions of all of the rotating members are determined when rotating conditions of two of the rotating members are determined; and braking means for braking one of the rotating members;

wherein five of the rotating members are connected to the input, the output, first and second mover/generators and the braking means, respectively, wherein the fastest rotating member and the slowest rotating member is connected to one of the first and second motor/generators, respectively, when the rotating members are revolving with a revolution speed difference, wherein the revolution speeds of the rotating members connected to the brake, the input and the output are between the revolution speeds of the rotating members connected respectively to the first and second motor/generators, and wherein an absolute value of the revolution speed of the rotating member connected to the output is greater than an absolute value of the revolution speed of the rotating member connected to the input when the braking means is put in the engaged state.

* * * * *